US009113134B2

(12) United States Patent
Kashima

(10) Patent No.: US 9,113,134 B2
(45) Date of Patent: *Aug. 18, 2015

(54) DISPLAY CONTROL APPARATUS, DISPLAY CONTROL METHOD, AND PROGRAM

(71) Applicant: Sony Corporation, Tokyo (JP)

(72) Inventor: Koji Kashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 241 days.

This patent is subject to a terminal disclaimer.

(21) Appl. No.: 13/800,482

(22) Filed: Mar. 13, 2013

(65) Prior Publication Data

US 2013/0209062 A1    Aug. 15, 2013

Related U.S. Application Data

(63) Continuation of application No. 12/565,032, filed on Sep. 23, 2009, now Pat. No. 8,422,857.

(30) Foreign Application Priority Data

Oct. 10, 2008    (JP) ................................. 2008-264112

(51) Int. Cl.
| H04N 9/87 | (2006.01) |
| G06T 11/60 | (2006.01) |
| G06T 19/00 | (2011.01) |
| H04N 5/77 | (2006.01) |
| H04N 5/91 | (2006.01) |
| H04N 9/82 | (2006.01) |

(52) U.S. Cl.
CPC ........ *H04N 9/87* (2013.01); *G06T 11/60* (2013.01); *G06T 19/00* (2013.01); *H04N 5/772* (2013.01); *H04N 5/91* (2013.01); *H04N 9/8205* (2013.01); *H04N 9/8227* (2013.01)

(58) Field of Classification Search
None
See application file for complete search history.

(56) References Cited

U.S. PATENT DOCUMENTS

| 6,160,553 | A | 12/2000 | Robertson et al. |
| 2002/0021281 | A1 | 2/2002 | Asami |
| 2002/0052689 | A1 | 5/2002 | Yamashita |
| 2005/0086612 | A1 | 4/2005 | Gettman et al. |
| 2005/0158021 | A1 | 7/2005 | Sato et al. |
| 2006/0171695 | A1* | 8/2006 | Jung et al. ........................ 396/56 |
| 2006/0212833 | A1* | 9/2006 | Gallagher et al. ............ 715/848 |

(Continued)

FOREIGN PATENT DOCUMENTS

| JP | 11-122638 | 4/1999 |
| JP | 2003-150620 | 5/2003 |

(Continued)

*Primary Examiner* — Hung Dang
*Assistant Examiner* — Sunghyoun Park
(74) *Attorney, Agent, or Firm* — Finnegan, Henderson, Farabow, Garrett & Dunner, L.L.P.

(57) ABSTRACT

A display control apparatus: in a virtual three-dimensional space in which is disposed a three-dimensional model of an object contained in a moving image picked up by performing successive imaging operations once by using an imaging device, draws a plurality of thumbnail images extracted from the moving image to the respective positions of the imaging device at the time when the thumbnail images were picked up and draws information that relates the thumbnail images in order in which they were picked up, thereby generating a bird's eye-display image which provides a bird's-eye-view drawing of the virtual three-dimensional space containing the three-dimensional model and the thumbnail images; and causes a display unit to display the bird's eye-display image.

16 Claims, 17 Drawing Sheets

(56) References Cited

U.S. PATENT DOCUMENTS

| | | |
|---|---|---|
| 2007/0140662 A1 | 6/2007 | Nunomaki |
| 2008/0159718 A1 | 7/2008 | Kuroiwa et al. |
| 2009/0015672 A1 * | 1/2009 | Clapp .......................... 348/143 |
| 2009/0129630 A1 | 5/2009 | Gloudemans et al. |

FOREIGN PATENT DOCUMENTS

| | | |
|---|---|---|
| JP | 2006-309722 | 11/2006 |
| JP | 2007-134771 | 5/2007 |
| JP | 2008-166988 | 7/2008 |
| JP | 2008-228135 | 9/2008 |

\* cited by examiner

DISPLAY CONTROL APPARATUS, DISPLAY CONTROL METHOD, AND PROGRAM

This is a continuation application Ser. No. 12/565,032, filed Sep. 23, 2009, which claims the right to priority based on Japanese Application No. 2008264112, filed Oct. 10, 2008 in Japan, all of which are incorporated herein by reference.

BACKGROUND OF THE INVENTION

1. Field of the Invention

The present invention relates to a display control apparatus, a display control method, and a program.

2. Description of the Related Art

There are regular playback display and film roll display available as a video display method for displaying moving images picked up and video-recorded with an imaging device such as a video camera. The regular playback display method will display a video (x-axis and y-axis of an imaging plane) by reproducing its video-recorded moving images sequentially from the beginning along a time axis t. The user can grasp imaged contents by viewing the video thus reproduced regularly but in a considerable lapse of time. To reduce the time, a method is available for fast-forwarding the moving images in playback display but still requires a lapse of time to some extent in order to grasp the imaged contents of the moving images as a whole.

On the other hand, the film roll display method will select a plurality of frame images from among video-recorded moving images at a predetermined time interval and displaying the frame images as thumbnail images sequentially in time series order (see Japanese Patent Application Laid-Open No. 2007-134771 and Japanese Patent Application Laid-Open No. 2008-166988, for example). According to the film roll display approach, if an arbitrary one is selected from among the thumbnail images displayed in a list, it is possible also to display the moving images by regularly reproducing them starting from a playback position that corresponds to the thumbnail image. According to such film roll display, the user can understand the imaged contents of the moving images as a whole more easily than by the regular playback display.

SUMMARY OF THE INVENTION

However, in the case of the film roll display method, if the time interval at which thumbnail images are picked up is too short, the user needs to view a lot of the thumbnail images and so spend a long time to grasp the imaged contents. On the other hand, if the time interval is too long, an interrelationship among the thumbnail images is decreased, thus making it difficult for the user to grasp the imaged contents. Further, by the film roll display method, the thumbnail images are just arranged on a two-dimensional plane surface in time series order, so that it is difficult to understand imaging situations such as the position of an imaging device and the relative positional relationship between the imaging device and a subject for photography at time of photographing.

The present invention has been made in view of the above issue, and it is desirable to provide a novel and improved display control apparatus, display control method, and program that can display the picked up contents and imaging situations of picked up moving images in a way easy to understand.

According to an embodiment of the present invention, there is provided a display control apparatus including, a storage unit that stores a moving image picked up by performing successive imaging operations once by using an imaging device; a display image generation unit that draws a plurality of thumbnail images extracted from the moving image to the respective positions of the imaging device at the time when the thumbnail images were picked up in a virtual three-dimensional space in which a three-dimensional model of an object contained in the moving image is disposed and draws information that relates the thumbnail images in order in which they were picked up in the virtual three-dimensional space, thereby generating a bird's eye-display image which provides a bird's-eye-view drawing of the virtual three-dimensional space containing the three-dimensional model and the thumbnail images; and a display control unit that causes a display unit to display the bird's eye-display image.

The storage unit may store movement track information which represents a movement track of the imaging device at the time when the imaging device picked up the moving image, as additional information of the moving image and the display image generation unit may draw the thumbnail images in the virtual three-dimensional space at the respective positions of the imaging device at the time when the thumbnail images were picked up based on the movement track information.

The information which relates the thumbnail images in order in which they were picked up may be a movement track line representing the movement track of the imaging device at the time when the imaging device picked up the moving image, and the display image generation unit may draw the movement track line in the virtual three-dimensional space in such a manner as to connect the thumbnail images in the order in which the thumbnail images were picked up based on the movement track information.

The display image generation unit may draw the movement track line connecting the thumbnail images in various line types in accordance with contents or imaging situations of the moving image between the thumbnail images.

The display image generation unit may draw an alternative image which represents the contents or imaging situations of at least some of the thumbnail images to the drawing positions of the thumbnail images in place of the thumbnail images.

The display image generation unit may change a size of the thumbnail images to be drawn in accordance with the drawing positions of the thumbnail images in the virtual three-dimensional space; and if the size of the thumbnail images to be drawn is a predetermined size or less, may draw the alternative image in place of the thumbnail images.

The display image generation unit may draw metadata about the thumbnail images in the virtual three-dimensional space in a condition where the metadata is related to the thumbnail images.

The display control apparatus further may include an image editing unit that edits the moving image in response to user operations on the thumbnail images or the three-dimensional model in the bird's eye-display image shown on the display unit.

The display control apparatus further may includes an image editing unit that generates, in response to specification of an angle in the bird's eye-display image shown on the display unit, the moving image as viewed at the specified angle.

The display control apparatus further may includes an image retrieval unit that retrieves the image containing the three-dimensional model which is the same as or similar to the three-dimensional model selected from the bird's eye-display image shown on the display unit or an object corresponding to the three-dimensional model.

According to another embodiment of the present invention, there is provided a display control method including the steps of: drawing a plurality of thumbnail images extracted from a moving image picked up by performing successive imaging operations once by using an imaging device to the respective positions of the imaging device at the time when the thumbnail images were picked up in a virtual three-dimensional space in which a three-dimensional model of an object contained in the moving image is disposed and draws information that relates the thumbnail images in order in which they were picked up in the virtual three-dimensional space, thereby generating a bird's eye-display image which provides a bird's-eye-view drawing of the virtual three-dimensional space containing the three-dimensional model and the thumbnail images; and causing a display unit to display the bird's eye-display image.

According to another embodiment of the present invention, there is provided a program for causing a computer to perform the steps of: drawing a plurality of thumbnail images extracted from a moving image picked up by performing successive imaging operations once by using an imaging device to the respective positions of the imaging device at the time when the thumbnail images were picked up in a virtual three-dimensional space in which a three-dimensional model of an object contained in the moving image is disposed and draws information that relates the thumbnail images in order in which they were picked up in the virtual three-dimensional space, thereby generating a bird's eye-display image which provides a bird's-eye-view drawing of the virtual three-dimensional space containing the three-dimensional model and the thumbnail images; and causing a display unit to display the bird's eye-display image.

According to the above configuration, in a virtual three-dimensional space in which is displayed a three-dimensional mode of an object contained in moving images picked up by a series of imaging operations of an imaging device, a plurality of thumbnail images extracted from the moving images are drawn to their respective positions of the imaging device at times when the thumbnail images were picked up. Further, the information which relates the thumbnail images in order in which they are picked up is drawn. As a result, a bird's eye-display image is generated which provides a bird's-eye-view drawing of the virtual three-dimensional space that contains the three-dimensional model and the thumbnail images. Furthermore, the bird's eye-display image is indicated on a display unit. Accordingly, a bird's eye-display image can be displayed which suitably represents the picked up contents imaging situations of moving images by using one image.

Thus, according to the present invention, it is possible to display picked up moving images in such a manner that their contents and imaging situations can be grasped easily.

DETAILED DESCRIPTION OF THE EMBODIMENTS

Figure 1:
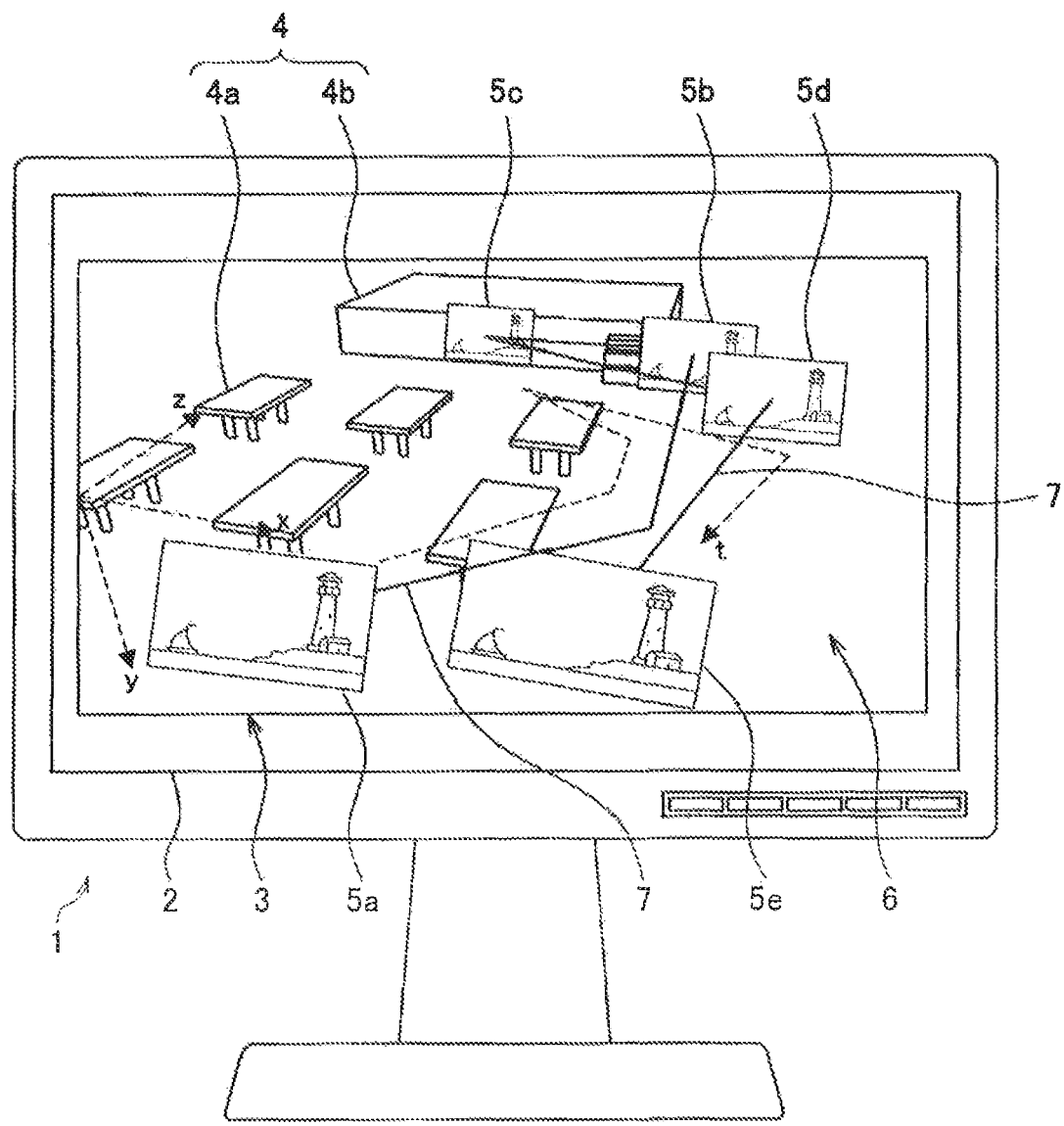
FIG. 1 shows a display device on which a bird's eye-display image according to one embodiment of the present invention is shown.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

A description will be given in the following order.
1. Outline of Bird'S Eye Display
2. First Embodiment (Bird's eye display at the time of imaging by imaging device)
3. Second Embodiment (Bird's eye display at the time of playback by information processing apparatus)

<1. Outline of Bird's Eye Display>

First, a description will be given of the outline of bird's eye display according to the first embodiment of the present invention with reference to FIG. 1. FIG. 1 shows an example of a display device 1, on which a bird's eye-display image 3 according to the present embodiment is displayed.

Bird's eye display according to the present embodiment is a video display approach for facilitating the user to grasp the picked up contents and imaging situations of a video (moving images) picked up with an imaging device when the video is being displayed on the display device 1.

As shown in FIG. 1, on a display screen 2 of the display device 1, a bird's eye-display image 3 is displayed. The bird's eye-display image 3 is a still image that schematically represents the contents of moving images picked up by a series of imaging operations of the imaging device. A series of imaging operations refer to, for example, serially picking up the moving images of a subject from a point in time when an imaging start button on the imaging device is pressed to a point in time when an imaging stop button on it is pressed, that is, "tree". By performing the series of imaging operations, moving image data is obtained as one imaging unit and then, usually recorded in a recording medium as one file. The bird's eye-display image 3 functions as an index image which is used to grasp the picked up contents and imaging situations of the data of an entirety of moving images picked up by the series of imaging operations.

Specifically, as shown in FIG. 1, the bird's eye-display image 3 provides a bird's eye drawing of a virtual three-dimensional space 6 containing three-dimensional models 4 of an object in a picked up moving image and a plurality of thumbnail images 5 extracted from the moving image. The virtual three-dimensional space 6 schematically represents a three-dimensional space (subject in an imaging range) of a reality imaged by the imaging device. In the virtual three-dimensional space 6, the three-dimensional models 4 of the object contained in the picked up moving image are disposed to the corresponding positions in a three-dimensional space of the reality.

The object means a target (that is, some subjects which were present in the imaging range) contained in the picked up moving image. An object represented as the three-dimensional model 4 may be, for example, an arbitrary tangible entity such as stuff, a person, a vehicle, or a building but should preferably have at least a certain size in order to be displayed as something which can be understood easily in the virtual three-dimensional space 6. The three-dimensional model 4 of such an object may be disposed as almost the same shape, to almost the same position, and in almost the same direction as those of an imaged object that was present in the three-dimensional space of the reality. In an example of the bird's eye-display image 3 of FIG. 1, the gymnasium of an elementary school is represented as the virtual three-dimensional space 6, while as the three-dimensional model 4 of the object, a plurality of tables 4a and a stage 4b present at the time of imaging are displayed.

Furthermore, in the virtual three-dimensional space 6 of the bird's eye-display image 3, a plurality of the thumbnail images 5 extracted from the moving image are drawn to their respective positions and in their respective directions of the imaging device at the time when the thumbnail images 5 were picked up. The thumbnail images 5 are frame images (still images) extracted from the data of a moving image picked up and video-recorded by a series of imaging operations of the imaging device. In one method for extracting thumbnail images from a moving image, a predetermined number of the thumbnail images 5 may be extracted from the moving image at a predetermined time interval. Further, thumbnail images picked up without moving the imaging device from a fixed position or thumbnail images having a good image quality may be selected and extracted from a moving image. It is thus possible to limit the number of the thumbnail images 5 to be displayed in the bird's eye-display image 3 to an appropriate number. Thus, a lot of the thumbnail images 5 will be drawn in the bird's eye-display image 3, thereby preventing complicated and redundant display.

In the example of FIG. 1, five thumbnail images 5a, 5b, 5c, 5d, and 5e are drawn in the virtual three-dimensional space 6 in order in which they were picked up. The thumbnail images 5a-5e are disposed to positions and in directions that respectively correspond to the actual positions and directions of the imaging device when the thumbnail images 5a-5e were picked up. For example, the top thumbnail image 5a (first thumbnail image 5a) of the moving image is disposed to a position that corresponds to an imaging starting position of the imaging device, that is, toward the user and to the left side in the virtual three-dimensional space 6. Further, the thumbnail image 5a is disposed in a direction (direction toward the three-dimensional model 4b of the stage from the imaging starting position) of the imaging device at the time when the thumbnail image 5a was picked up.

Further, the thumbnail images 5 are drawn in perspective in the virtual three-dimensional space 6 in such a manner that they may be larger toward front and smaller toward the back in the virtual three-dimensional space 6. For example, the first thumbnail image 5a and the fifth thumbnail image 5e were picked up from an actual imaging position toward front and so drawn as expanded toward you in the virtual three-dimensional space 6. On the other hand, the third thumbnail image 5c was picked up from an actual imaging position toward the back most (toward the stage) and so drawn as shrunk toward the back in the virtual three-dimensional space 6.

in such a manner, the thumbnail images 5 are drawn in the virtual three-dimensional space 6 in such a manner that their positions, directions, and sizes may correspond to their respective positions and in their respective directions of the imaging device at the time when they were picked up.

Moreover, in the virtual three-dimensional space 6, a movement track line 7 of the imaging device is drawn in such a manner as to interconnect the plurality of thumbnail images 5 sequentially. The movement track line 7 is one example of information that interrelates the plurality of thumbnail images 5 in order in which they were picked up and represents a movement track of the imaging device as it picked up a moving image actually. The movement track line 7 interconnects the plurality of thumbnail images 5 along time series in order in which they were picked up and is drawn along an actual movement path (that is, imaging positions) of the imaging device. By drawing such a movement track line 7, it is possible to properly represent the interrelationship and pickup positions of the thumbnail images 5. Accordingly, based on the movement track line 7, the user can easily understand the order in which the thumbnail images 5 were picked up and the movement track of the imaging device as it picked up the moving image. It is to be noted that although not described in detail, the movement track line 7 is drawn based on imaging position information obtained with various sensors mounted on the imaging device.

In such a manner, in the bird's eye-display image 3 and in the virtual three-dimensional space 6 wherein the three-dimensional models 4 of an object contained in a picked-up moving image are disposed, a plurality of the thumbnail images 5 extracted from the moving image are drawn to their respective positions and in their respective directions of the imaging device at the time of imaging. Then, the bird's eye-display image 3 which provides a bird's-eye-view drawing of the virtual three-dimensional space 6 containing the thumbnail images 5 and the three-dimensional models 4 of such an object is generated and displayed on the display screen 2 of the display device 1. Thus, in the virtual three-dimensional space 6, the bird's eye-display image 3 may provide a bird's eye display of the thumbnail images 5 of an actually picked-up moving image and the three-dimensional models 4 of an object which appears in the moving image in a condition where they are interrelated. Hereinafter, this display approach is referred to as "four-dimensional time-space bird's eye display".

By viewing the bird's eye-display image 3 given in such four-dimensional bird's eye display, the user can simultaneously grasp a depth axis z and a photographing time axis t as well as the x- and y-axes of the imaging plane at the time when moving image data was obtained. That is, the user can easily grasp not only the contents of a moving image but also its imaging situations based on the positional relationship between the three-dimensional models 4 and the thumbnail images 5 in the bird's eye-display image 3, the layout, directions, and sizes of the thumbnail images 5, and the movement track line 7. Accordingly, the user can view the bird's eye-display image 3 which provides index display of a moving image, thereby easily understanding where and how the moving image was picked up.

It is to be noted that the display device 1 for displaying the bird's eye-display image 3 may be either a two-dimensional display (x, y) or a three-dimensional display (x, y, z).

Further, the method for generating the three-dimensional model 4 of an object is not limited to any predetermined method and may be any method publicly known, coming in, for example, the following methods (a)-(d).

(a) Method for Generating the Three-dimensional Model 4 by Utilizing Various Sensors Mounted on the Imaging Device For example, the imaging device may be equipped with a distance sensor which measures a distance between the imaging device and an object at the time of imaging and a movement track sensor which measures a movement track or posture of the imaging device at the time of imaging. The movement track sensor may be, for example, an angular velocity sensor, an acceleration sensor, a magnetic sensor, a global positioning system (GPS) sensor, etc. The display control apparatus such as the imaging device or the information processing apparatus uses such various sensors, to measure the distance between the imaging device and an object as well as the movement track or posture of the imaging, device at a time when a moving image was picked up. Then, the display control apparatus analyzes the measurement data and moving image data, to estimate the shape, the position, and the direction of the object present in an imaged space, thereby generating its three-dimensional model 4.

(b) Method for Automatically Extracting the Three-dimensional Model 4 from Moving Image Data by Using Software Software (program) for generating a three-dimensional model is installed to the display control apparatus such as the imaging device or the information processing apparatus. The software analyzes the data of a moving image and identifies and extracts an object contained in a video given by the moving image data, to estimate its shape, position, and size, thereby generating the three-dimensional model 4. It is to be noted that the display control apparatus may be arranged to acquire the data of the three-dimensional model 4 similarly generated by any other device from the device via a recording medium or a network.

(c) Method for Manually Generating the Three-dimensional Model 4

The user manually generates a three-dimensional model 4 as viewing an image displayed based on reproduced moving image data. The manual reproduction of the three-dimensional model 4 may be carried out in the display control apparatus such as an imaging device or an information processing apparatus or any other devices. In the case of the latter, the display control apparatus may acquire information about the three-dimensional model 4 via a network from these any other devices or recording media.

(d) Combination of Three-dimensional Models 4 Generated by the Methods of (a)-(c)

The display control apparatus combines three-dimensional models 4 generated by the methods of (a)-(c), to generate a final three-dimensional model 4 to be disposed in the virtual three-dimensional space 6.

A description has been given of the methods for generating the three-dimensional model 4 of an object contained in a moving image. It is to be noted that the three-dimensional model 4 to be drawn in the virtual three-dimensional space 6 may be a faithful representation or simplified representation of an actual object or such a simplified three-dimensional model 4 from which unnecessary entities have been omitted. For example, in the bird's eye-display image 3, the three-dimensional model 4 may be displayed simply in black and white. It is thus possible to emphasize the thumbnail images 5 disposed around that three-dimensional model 4 so that the thumbnail images 5 may be viewed easily. It is to be noted that in the bird's eye-display image 3, rather than drawing none of the three-dimensional model 4 at all in the virtual three-dimensional space 6, only the thumbnail images 5 may be drawn or, without drawing the three-dimensional model 4, the thumbnail images 5 and the later-described movement track line 7 or metadata 16 may be drawn instead.

Further, the display control apparatus can select a position where the three-dimensional model 4 is to be drawn in the bird's eye-display image 3, in accordance with the imaging time in a moving image specified by the user. For example, by selecting only one time, all of times, or a periodic time for each three-dimensional model 4, its drawing position and whether it is to be drawn can be controlled.

Further, although not only horizontal movement but also vertical movement of the imaging position can be represented in the bird's eye-display image 3, three-dimensional models of an object inconvenient to look down at (for example, a floor or a ceiling) may be omitted in drawing as appropriate.

Further, the display control apparatus is capable of arbitrarily changing a viewpoint (viewpoint in four-dimensional time-space bird's eye display) that serves as a reference in providing bird's eye display of the above bird's eye-display image 3, in accordance with user selection. For example, the display control apparatus can analyze a moving image to thereby obtain an optimal viewpoint to grasp contents of the moving image as a whole and present the user with it as a recommendable viewpoint.

A comparison will be given between the bird's eye-display image 3 (FIG. 1), an image 8 by regular playback display (FIG. 2), and an image 9 by film roll display (FIG. 3) with reference to FIGS. 2 and 3.

Figure 2:
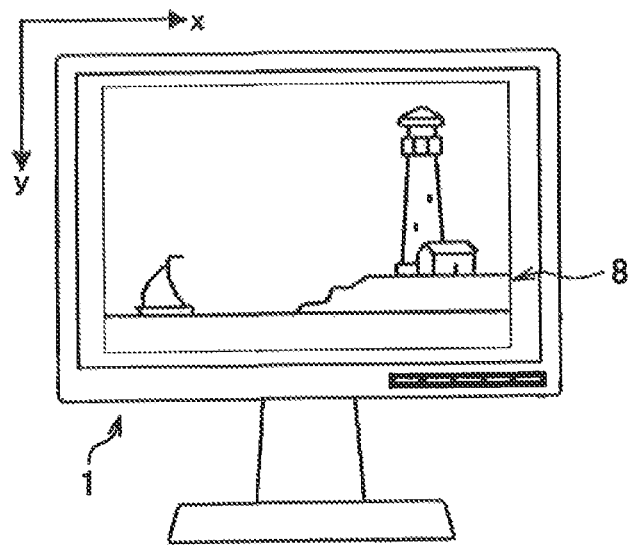
FIG. 2 shows the display device on which a regular playback-display image according to the embodiment is shown.

As shown in FIG. 2, regular playback display is a regular display method of reproducing videos (x- and y-axes of the imaging plane) of a video-recorded moving image sequentially along the time t-axis. In such regular playback display, only one of the images 8 being reproduced is displayed, thus taking a long time to grasp the contents of the moving image as a whole.

Figure 3:
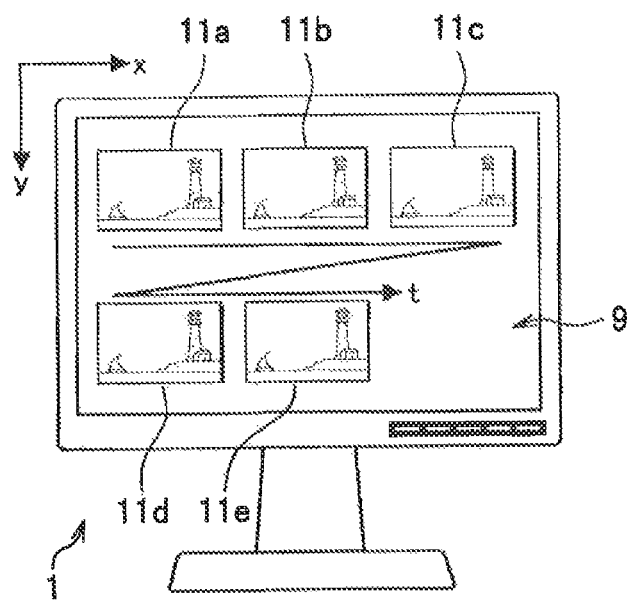
FIG. 3 shows the display device on which a film roll display image according to the embodiment is shown.

Further, as shown in FIG. 3, film roll display is a method of extracting a plurality of thumbnail images (frame images) 11a-11e at a predetermined time interval from a video-recorded moving image and sequentially displaying the images 1a-1e in time series order. Such film roll display provides easy-to-grasp imaged contents as compared to the above regular playback display. However, if the time interval at which the thumbnail images 11a-11e are extracted is too short, a plurality of the thumbnail images 11a-11e are displayed at a time and so complicated, thus taking a long time to grasp the imaged contents. On the other hand, if the time interval is too long, an interrelationship among the thumbnail images 11a-11e deteriorates, thus disabling grasping the imaged contents.

Meanwhile, as shown in FIG. 1, in the bird's eye-display image 3 according to the present embodiment, it is possible not only to simultaneously grasp the x-axis, y-axis, and depth z-axis of the imaging plane and the photographing time t-axis of a picked-up moving image but also to grasp photographing order, imaging positions, and directions of the thumbnail images 5. Therefore, the user can grasp where and how he picked up that moving image, thus easily understanding the imaged contents and the imaging situations.

The bird's eye-display image 3 by use of four-dimensional time-space bird's eye display has been outlined as above. Next, a description will be given of suitable embodiments of the display control apparatus and display control method for displaying the bird's eye-display image 3.

<2. First Embodiment>

Figure 4:
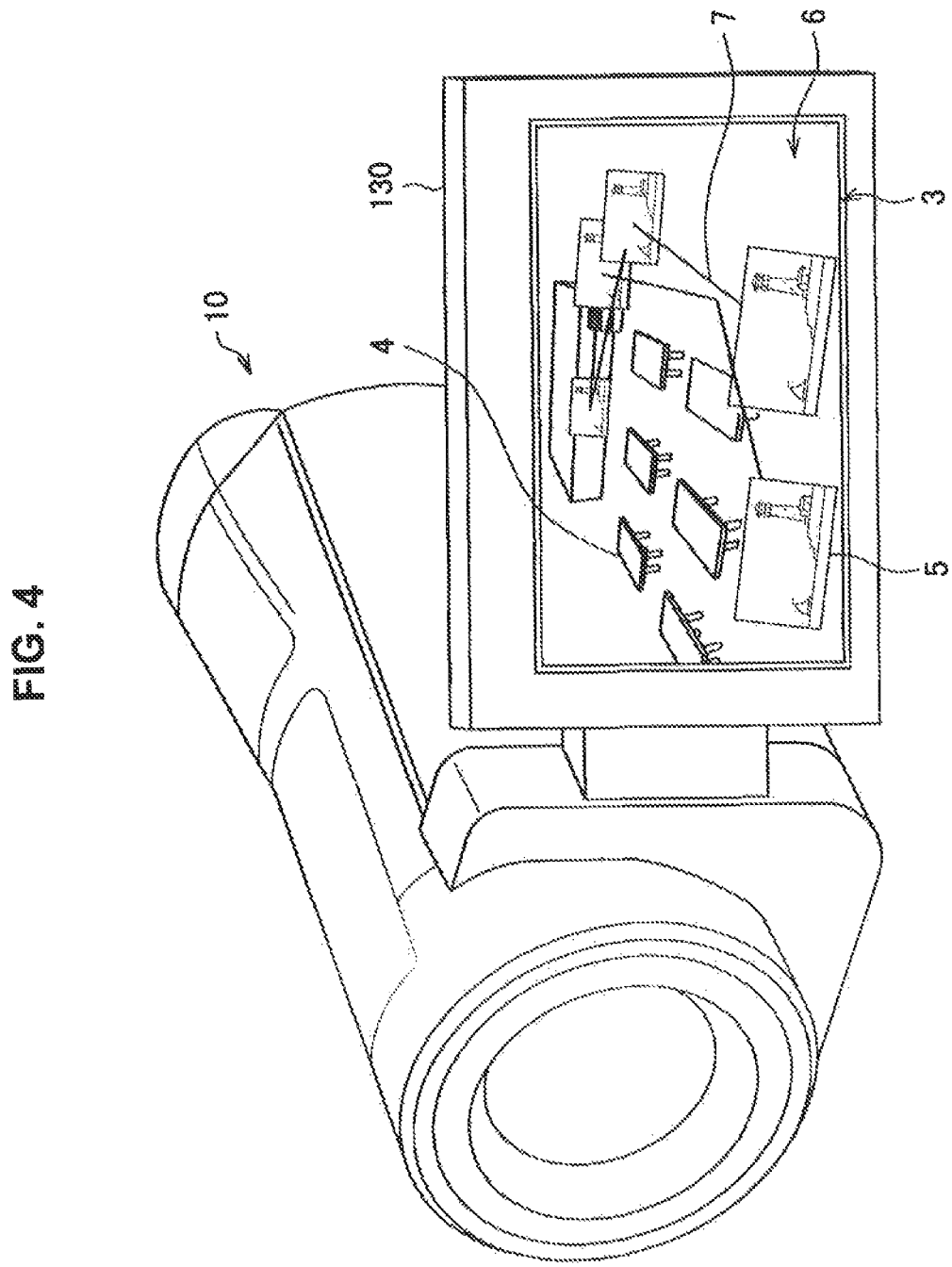
FIG. 4 shows an imaging device that displays a bird's eye-display image according to a first embodiment of the present invention.

First, a description will be given of the display control apparatus and method according to the first embodiment of the present invention, As shown in FIG. 4, the first embodiment may be an example in which the display control apparatus of the present invention has been applied to an imaging device 10 (for example, video camera). As a real time application in imaging by the imaging device 10, the bird's eye-display image 3 is displayed on a display device 130 equipped to the imaging device 10. For example, if the user would like to confirm the video-recorded contents of a 1 rec moving image as or after picking it up and video-recording it with the imaging device 10, the bird's eye-display image 3 about data of the moving image will be displayed on the display device 130,

[Hardware Configuration of Imaging Device]

Figure 5:
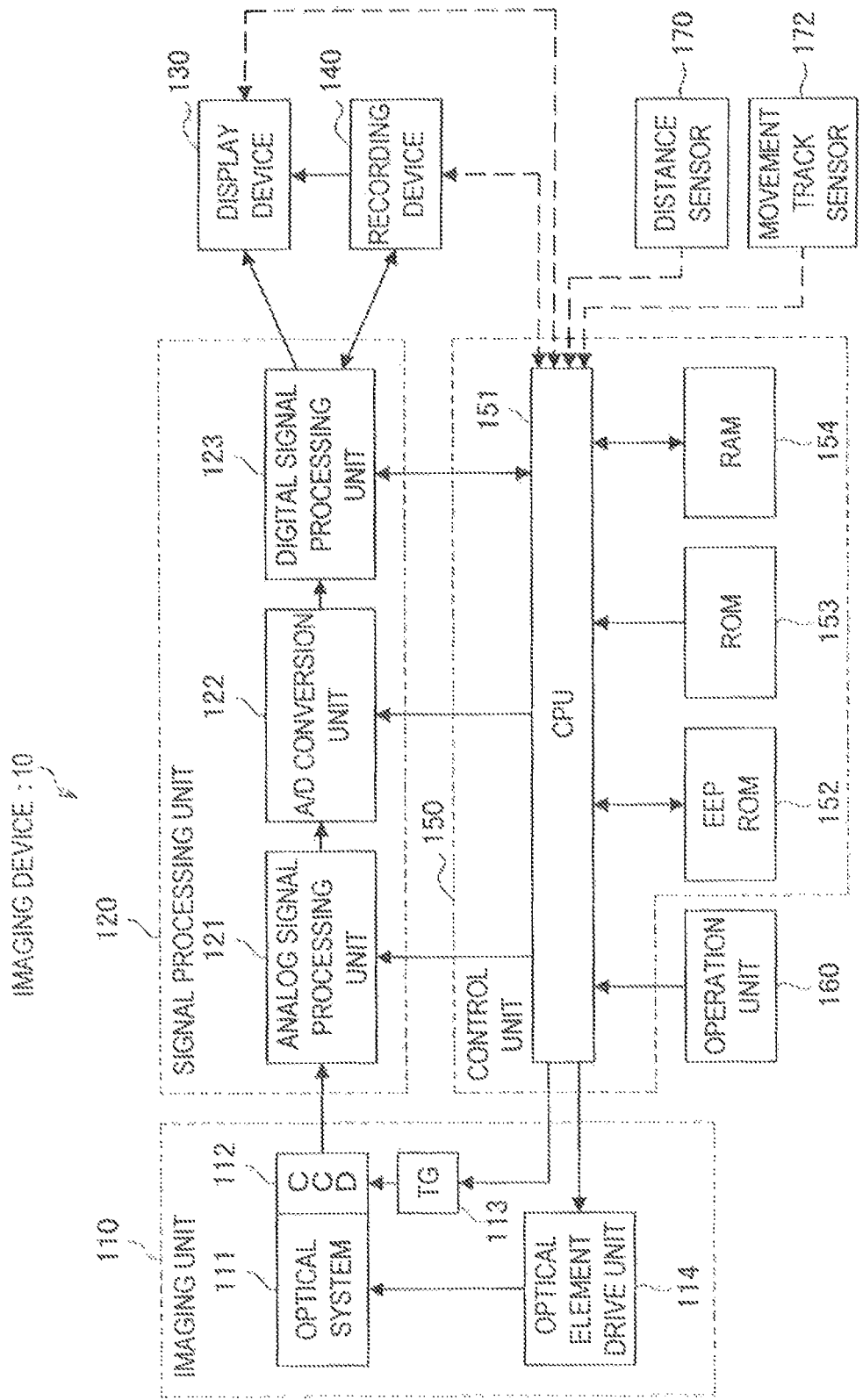
FIG. 5 is a block diagram showing a hardware configuration of the imaging device according to the embodiment.

First, a description will be given of a hardware configuration of the imaging device 10 according to the present embodiment in detail with reference to FIG. 5. FIG. 5 is a block diagram showing the hardware configuration of the imaging device 10 according to the present embodiment.

As shown in FIG. 5, the imaging device 10 according to the present embodiment schematically includes an imaging unit 110, a signal processing unit 120, a display device 130, a recording device 140, a control unit 150, an operation unit 160, a distance sensor 170, and a movement track sensor 172.

The imaging unit 110 images a subject and outputs an analog image signal. The imaging unit 110 includes an imaging optical system 111, an imaging element 112, a timing generator 113, and an optical element drive unit 114.

The imaging optical system 111 includes various lenses such as a focus lens and a zoom lens, an optical filter that removes unnecessary wavelengths, and an optical element such as an aperture diaphragm. Light made incident from the subject passes through the optical elements in the imaging optical system 111 up to the imaging element 112. The imaging element 112 includes a solid-state imaging element such as, for example, a charge coupled device (CCD) or a complementary metal oxide semiconductor (CMOS). The imaging element 112 conducts photoelectric conversion on the light guided via the imaging optical system 111 and outputs an electric signal (analog image signal) that represents a picked up image.

To the imaging optical system 111, an actuator (not shown) is mechanically connected which is a drive mechanism for adjusting the aperture diaphragm and moving the focus lens. The actuator is connected also to the optical element drive unit 114, which controls driving thereof. The optical element drive unit 114 controls the driving of the optical elements of the imaging optical system 111 in accordance with instructions from the later-described central processing unit (CPU) 151. The timing generator (TG) 113 generates operations pulses necessary for the imaging element 112 in accordance with the instructions from the CPU 151. For example, the TG70 generates various pukes such as four-phase pulses and field-shift pulses necessary for vertical transfer and two-phase pulses and shutter pulses necessary for horizontal transfer and supplies the pulses to the imaging element 112. The TG70 enables driving the imaging element 112 (electronic shutter function).

The image signal output from the imaging element 112 is input to the signal processing unit 120. The signal processing unit 120 performs predetermined signal processing on the image signal supplied from the imaging element 112 and the post-signal processing image signal to the display device 130 and the recording device 140. The signal processing unit 120 includes an analog signal processing unit 121, an analog/digital (A/D) conversion unit 122, and a digital signal processing unit 123.

The analog signal processing unit 121 is so-called an analog front end for performing preprocessing on the image signal. For example, the analog signal processing unit 121 performs correlated double sampling (CDS) processing and gain processing by use of a programmable gain amplifier (PGA) on the electric signal as a picked up image output from the imaging element 112. Then, the analog signal processing unit 121 supplies the A/D conversion unit 122 with the image signal obtained as a result of the preprocessing. The A/D conversion unit 122 converts the supplied analog image signal into a digital image signal and supplies it to the digital signal processing unit 123. The digital signal processing unit 123 performs digital signal processing such as, for example, gamma correction processing and white balance processing on the supplied digital image signal, thus generating a video signal of the picked up image. The digital signal processing unit 123 outputs the thus generated video signal of the picked-up image data to the display device 130 and the recording device 140.

The display device 130 includes a liquid crystal display (LCD) or an organic EL display. The display device 130 displays various kinds of image data supplied thereto. For example, the display device 130 displays the data of images in the middle of pick-up as it is being supplied from the signal processing unit 120 in real time during imaging. This permits the user to carry out photographing as viewing the images being picked up by the imaging device 10. Further, if the data of picked up images recorded in the recording device 140 is reproduced, the display device 130 displays the reproduced image data input from the recording device 140. This permits the user to confirm the contents of picked-up image data recorded in the recording device 140. It is to be noted that the display device 130 displays the above bird's eye-display image 3 (see FIG. 1), whose details will be described later.

The recording device 140 records in a recording medium the various kinds of data such as data of the thus picked up images and its metadata. The recording device 140 can include an arbitrary recording device such as an optical disc drive or a hard disk drive (HDD). The recording medium to be used may be a removable medium such as, for example, an optical disc, a semiconductor memory such as a memory card, or a hard disk. The optical disc may be, for example, a blu-ray disc, a digital versatile disc (DVD), or a compact disc (CD). The recording medium to be used may have been built in the imaging device 10.

The control unit 100 includes a microcontroller and controls operations of the imaging device 10 as a whole. The control unit 100 includes, for example, the CPU 151, an EEPROM 152, a read only memory (ROM) 153, and a random access memory (RAM) 155. It is to be noted that the EEPROM stands for "electrically erasable programmable ROM".

The CPU 151 controls the TG 113 and the optical element drive unit 114 in the imaging unit 110, thus controlling imaging processing by the imaging unit 110. For example, the CPU 151 conducts automatic exposure control by adjusting the aperture diaphragm of the imaging optical system 111 and setting an electronic shutter speed of the imaging element 112 and a gain of an AGC in the analog signal processing unit 121. Further, the CPU 151 conducts auto-focus control to automatically focus the lens on the subject by, for example, driving the focus lens in the imaging optical system 111. Further, the CPU 151 controls processing to record and reproduce picked-up image data by using the recording device 140. Further, the CPU 151 conducts display control to display various kinds of display data on the display device 130. It is to be noted that the CPU 151 performs processing to generate the bird's eye-display image 3 (see FIG. 1) and display control processing to display the bird's eye-display image 3 on the display device 130, whose details will be described later.

In the ROM 153 in the control unit 100, a program is stored which is used to cause the CPU 151 to perform various kinds of control processing. The CPU 151 operates based on the program, to perform arithmetic operations and control processing necessary for the above various kinds of control as using the RAM 154. The program can be stored beforehand in a storage device (for example, the ROM 153) built in the imaging device. Further, the program may be provided to the imaging device in a condition where it is stored on a removable recording medium such as a CD, DVD, blu-ray disc, or memory card or may be downloaded to the imaging device via a network such as a LAN or the Internet.

The operation unit 160 and the display device 130 function as a user interface. The operation unit 160 includes an operation button or a touch panel and outputs designated information to the control unit 100 in accordance with user operations. It is to be noted that the operation unit 160 and the display device 130 may each include a device separate from the imaging device 10.

The distance sensor 170 is used to measure a distance between a subject to be imaged and the imaging device 10. The distance sensor 170 enables measuring the distance between an object contained in an imaging range as the subject and the imaging device 10 during imaging by the imaging device 10. On the other hand, the movement track sensor 172 is used to measure a position, a movement track, and a posture of the imaging device 10 during imaging and may include, for example, an angular velocity sensor, an acceleration sensor, a magnetic sensor, or a GPS sensor. The distance sensor 170 and movement track sensor 172 are used to draw the three-dimensional model 4 and the movement track line 7 present in the bird's eye-display image 3, whose details will be described later,

[Functional Configuration of Imaging Device]

Figure 6:
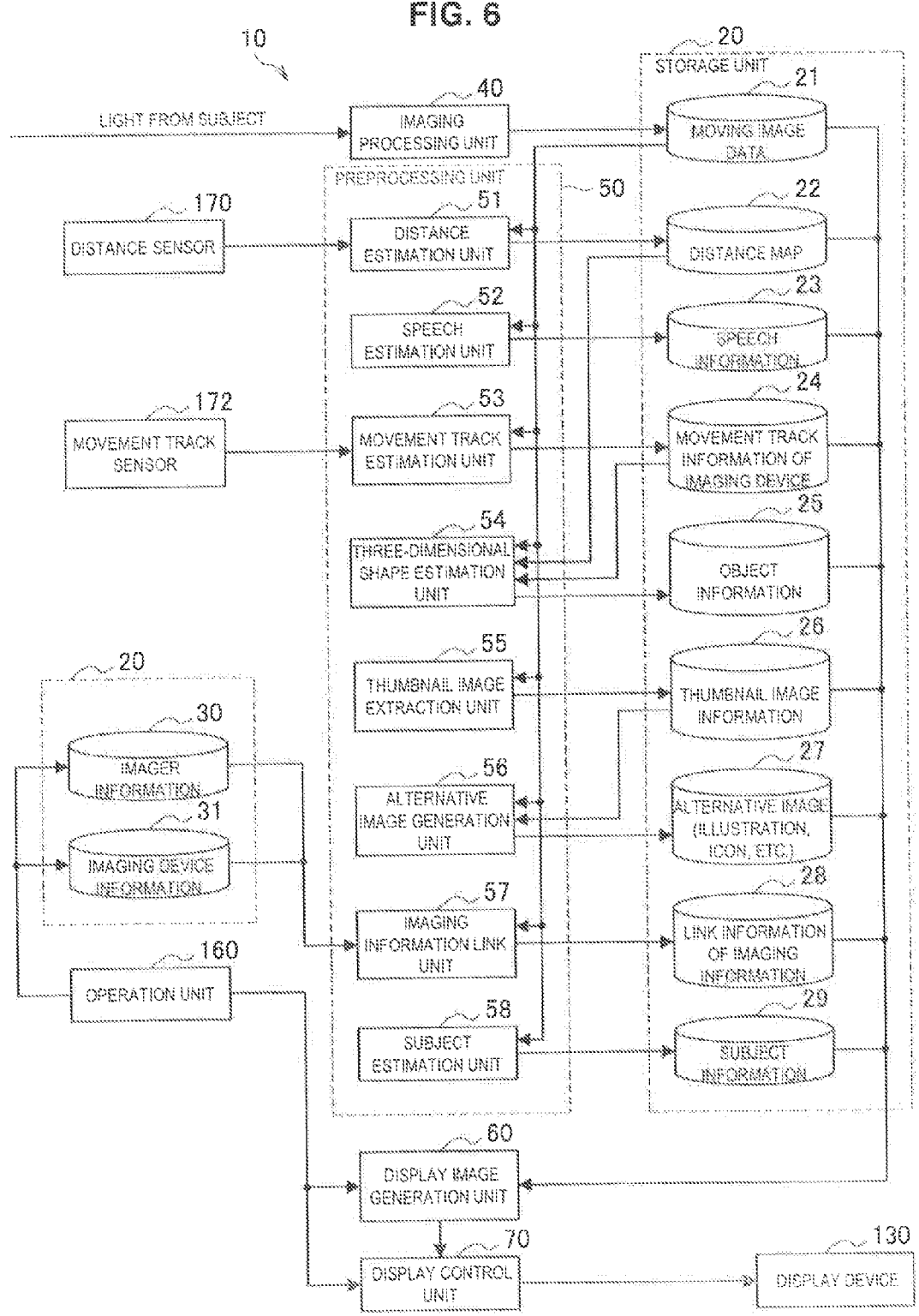
FIG. 6 is a block diagram showing a functional configuration of the imaging device according to the embodiment.

Next, a description will be given in detail of the functional configuration of the imaging device 10 according to the present embodiment with reference to FIG. 6. FIG. 6 is a block diagram showing the functional configuration of the imaging device 10 according to the present embodiment. It is to be noted that FIG. 6 schematically shows the functional units that are used to display the bird's eye-display image 3, which features the present embodiment.

As shown in FIG. 6, the imaging device 10 includes a storage unit 20, an imaging processing unit 40, a preprocessing unit 50, a display image generation unit 60, the display control unit 70, the display device 130, the operation unit 160, the distance sensor 170, and the movement track sensor 172. Of these, the preprocessing unit 50, the display image generation unit 60, and the display control unit 70 are realized by, for example, software installed in the imaging device 10. That is, for example, the CPU 151 shown in FIG. 5 operates in accordance with the program stored in the ROM 153 etc., thereby functioning as the preprocessing unit 50, the display image generation unit 60, and the display control unit 70. It is to be noted that the program can be provided to the imaging device 10 via a recording medium or a network. Next, a description will be given in detail of each of the units.

The storage unit 20 stores various information pieces 21-31 such as moving image data 21 and thumbnail image information 26. The storage unit 20 includes, for example, the recording device 140 or the EEPROM 152 shown in FIG. 5.

The imaging processing unit 40 images the subject and obtains the moving image data 21. The imaging processing unit 40 includes, for example, the imaging unit 110 and the signal processing unit 120 shown in FIG. 5. The imaging processing unit 40 records the obtained moving image data 21 in the storage unit 20.

The preprocessing unit 50 performs preprocessing to generate various kinds of information and data necessary for generating the bird's eye-display image 3 such as shown in FIG. 1. The preprocessing unit 50 includes a distance estimation unit 51, a speech estimation unit 52, a movement track estimation unit 53, a three-dimensional shape estimation unit 54, a thumbnail image extraction unit 55, an alternative image generation unit 56, an imaging information link unit 57, and a subject estimation unit 58.

The distance estimation unit 51 performs processing to estimate a distance relation between the imaging device 10 and an object. As described above, the imaging device 10 is equipped with the distance sensor 170 which utilizes, for example, a laser or a sound or millimeter-wave radar. The distance sensor 170 measures the distance between the imaging device 10 and an object present in the imaging range as the subject, during imaging by the imaging device 10. The distance estimation unit 51 estimates the distances from the imaging device 10 to a plurality of the objects present in the imaging space and the distances between the objects based on the distance information measured by the distance sensor 170 and then results of analysis on the moving image data 24. Then, the distance estimation unit 51 generates a distance map 22 which indicates the positional relations between the imaging device 10 and the objects at the time of imaging based on the estimated distance information and saves the distance map 22 in the storage unit 20. It is to be noted that to measure the distance from the imaging device to a target, a ranging method is available based on stereopsis (binocular stereopsis) using a plurality of cameras (imaging units). The distance estimation unit 51 can estimate the distance from the imaging device 10 to a plurality of objects present in an imaging space and the distance between the objects by using the ranging method based on the stereopsis (binocular stereopsis).

The speech estimation unit 52 analyzes audio data added to the moving image data 21, to detect an image position (which corresponds to an imaging time) at which a sound of interest in the moving image has been recorded. The sound of interest refers to, for example, a sound related to the contents of the moving image such as, for example, words (speech) spoken by a person or a sound effect of objects, excluding sounds such as noise and environmental sounds. The speech estimation unit 52 generates speech information 23 that represents an image position at which a meaningful sound is recorded and saves it in the storage unit 20. It is to be noted that although a sound acquisition unit (microphone etc.) to acquire sounds at the time of imaging has been omitted in the block diagram of the imaging device shown in FIG. 5, the imaging device 10 can include the sound acquisition unit.

The movement track estimation unit 53 estimates a movement track and a posture of the imaging device 10 at a time when the moving image has been picked up based on results of the analysis of the moving image data 21 and the measurement data by the movement track sensor 172. As described above, the imaging device 10 is equipped with the distance sensor 170. The distance sensor 170 may be, for example, an angular velocity sensor, an acceleration sensor, a magnetic sensor, or a GPS sensor. The angular velocity sensor and the acceleration sensor detect an angular velocity and an acceleration as the imaging device 10 has moved during imaging, respectively. The magnetic sensor detects a magnetic field around the imaging device 10, thereby detecting a direction of the imaging device 10. The GPS sensor detects position information (latitude and longitude) of the imaging device 10. The movement track sensor 172 supplies the movement track estimation unit 53 with measurement data such as the thus detected angular velocity, acceleration, variation in magnetic field, and imaging position of the imaging device 10. The movement track estimation unit 53 analyzes such measurement data and the above moving image data 21, thereby estimating a movement track and a posture of the imaging device 10 at the time when the moving image has been picked up. Then, the movement track estimation unit 53 saves movement track information 24 that indicated the estimated movement track and posture of the imaging device 10, in the storage unit 20.

The three-dimensional shape estimation unit 54 estimates three-dimensional shapes and positions of objects (for example, the table and the stage in FIG. 1) contained in the moving image based on the distance map 22 and the movement track information 24 about the imaging device 10. The objects contained in the moving image refer to the objects that have been present as a subject in the imaging range at the time of imaging. Then, the three-dimensional shape estimation unit 54 stores object information 25 that represents the estimated three-dimensional shapes and positions of the objects, in the storage unit 25. The three-dimensional shape estimation unit 54 may generate the three-dimensional models 4 of the respective objects based on the estimated three-dimensional shapes and positions of the objects and save information of the three-dimensional models 4 in the storage unit 20.

The thumbnail image extraction unit 55 extracts a plurality of the thumbnail images 5 from the data of the moving image picked up by the imaging device 10. The thumbnail images 5 are frame images that represent feature images of that moving image. The thumbnail image extraction unit 55 may automatically extract a predetermined number of the thumbnail images 5 from the moving image at a predetermined time interval or selectively extract the thumbnail images 5 picked up in a condition where the device is stopped or those that have a good image quality. The thumbnail image extraction unit 55 saves the extracted plurality of thumbnail images 5 as they are or information that indicates the corresponding imaging positions (imaging times) as thumbnail image information 26, in the storage unit 20.

The alternative image generation unit 56 generates an alternative image that represents the contents or imaging situation of the thus extracted thumbnail images 5. The alternative image will be displayed in place of the thumbnail images 5 in the bird's eye-display image 3, coming in an icon, an illustration, a still image, or a text, for example. The imaging situation of the thumbnail images 5 includes, for example, a direction of the imaging device 10 at the time of picking up the thumbnail images 5, camera's preset values such as a zoom, a focus, an exposure, and an image quality, a movement speed of the imaging device, an operating condition of the imaging device 10, and a camera shake. The contents (imaged contents) of the thumbnail images 5 are information about subjects contained in the thumbnail images 5, corning in names, identification information, operations, sizes, and imaging environments of the subjects, for example. The alternative image generation unit 56 can convert the thumbnail images 5 into icons and illustrations, thereby generating the icons and the illustrations (for example, illustrations of the faces of persons contained in the thumbnail images 5) of the contents of the thumbnail images 5. The alternative image generation unit 56 saves the thus generated alternative image 27 in the storage unit 20.

The imaging information link unit 57 relates imaging information containing imaging person information 30 and imaging device information 31 to the moving image data 21, thus generating link information 28 of the imaging information. The imaging person information 30 represents a person who imaged the moving image, such as the name, identification information, and behavior of the person. The imaging device information 31 is related to the imaging device 10 which has given the moving image data 21, thus representing the imaging conditions such as the manufacturer's name, model name, identification information, and camera installation values of the imaging device 10, the operating conditions of the imaging device 10, the type of videos, the format of images, and the operations, for example. The imaging person information 30 and the imaging device information 31 may be generated based on user operations on the operation unit 160 or automatically by the imaging device 10.

The imaging information including such imaging person information 30 and imaging device information 31 represents imaging conditions under which the moving image data 21 has been obtained through imaging and functions as identification information or attribute information of the moving image data 21. Therefore, by relating such imaging information to the moving image data 21, it is possible to identify moving image data and more accurately grasp the contents of the moving image data 21. Accordingly, the imaging information link unit 57 relates the imaging information and the moving image data 21 to generate the link information 28 of the imaging information and saves it in the storage unit 20. It is to be noted that the imaging information may be related to the 1 rec moving image data 21 as a whole or for each predetermined image unit (for example, each frame) thereof, depending on its contents. In the case of the latter, it is possible to relate the imaging information to each of the thumbnail images 5 and, therefore, display the thumbnail images 5 and metadata indicating their contents or imaging situations in the bird's eye-display image 3 (see FIG. 10).

The subject estimation unit 58 analyzes the moving image data 21 to estimate a subject contained in the picked up moving image, thereby generating subject information 29. The subject information 29 contains the name, behavior, size, and imaging environments of the subject contained in the moving image. The subject estimation unit 58 saves the generated subject information 29 in the storage unit 20.

The display image generation unit 60 generates the bird's eye-display image 3 based on the moving image data 21 and the various information pieces generated by the preprocessing unit 50, that is, data pieces 22-29. Specifically, the display image generation unit 60 draws the virtual three-dimensional space 6 in which the three-dimensional model 4 of the object contained in the moving image data 21 is disposed based on the above distance map 22, movement track information 24, object information 25, etc. Then, the display image generation unit 60 draws the plurality of thumbnail images 5 extracted from the moving image data 21 at their respective imaging positions in the virtual three-dimensional space 6 based on the movement track information 24, the thumbnail image information 26, etc. Further, the display image generation unit 60 draws the movement track line 7 that interrelates the thumbnail images 5 in order in which they were picked up based on the movement track information 24 etc. As a result, as shown in FIG. 1, the bird's eye-display image 3 is generated which provides a bird's-eye-view drawing of the virtual three-dimensional space 6 containing the three-dimensional model 4 and the thumbnail images 5.

The display image generation unit 60 identifies positions (imaging positions of the thumbnail images 5) and directions of the imaging device 10 at a time when it has picked up the thumbnail images 5 based on the movement track information 24 and draws the thumbnail images at the positions and in the directions respectively in the virtual three-dimensional space 6. In this case, the display image generation unit 60 changes the sizes of the thumbnail images 5 and the three-dimensional model 4 in accordance with positions at which they are drawn in the virtual three-dimensional space 6. For example, the thumbnail images 5 will be small if they are drawn backward in the virtual three-dimensional space 6 and will be large if they are drawn forward in the virtual three-dimensional space 6. Thus, the virtual three-dimensional space 6 can be displayed as if viewed from an obliquely upward viewpoint so that the imaging situations may be grasped easily.

It is to be noted that the display image generation unit 60 may relates the generated bird's eye-display image 3 to the moving image data 21 and save it in the storage unit 20. This eliminates the necessity of regenerating the bird's eye-display image 3 of the same moving image data 21. Further, the display image generation unit 60 can draw various kinds of additional information in the bird's eye-display image 3 based on the speech information 23, the alternative image 27, the link information 28 of the imaging information, or the subject information 29, whose details will be described later.

The display control unit 70 controls the display device 130 (for example, LCD) so that it may display the bird's eye-display image 3 generated by the display image generation unit 60. This may cause the display device 130 to display the bird's eye-display image 3. It is to be noted that display control by the display control unit 70 and generation of the bird's eye-display image 3 by the display image generation unit 60 may be performed in response to user operations on the operation unit 160 or automatically performed in accordance with the setting.

[Display Control Flow]

Figure 7:
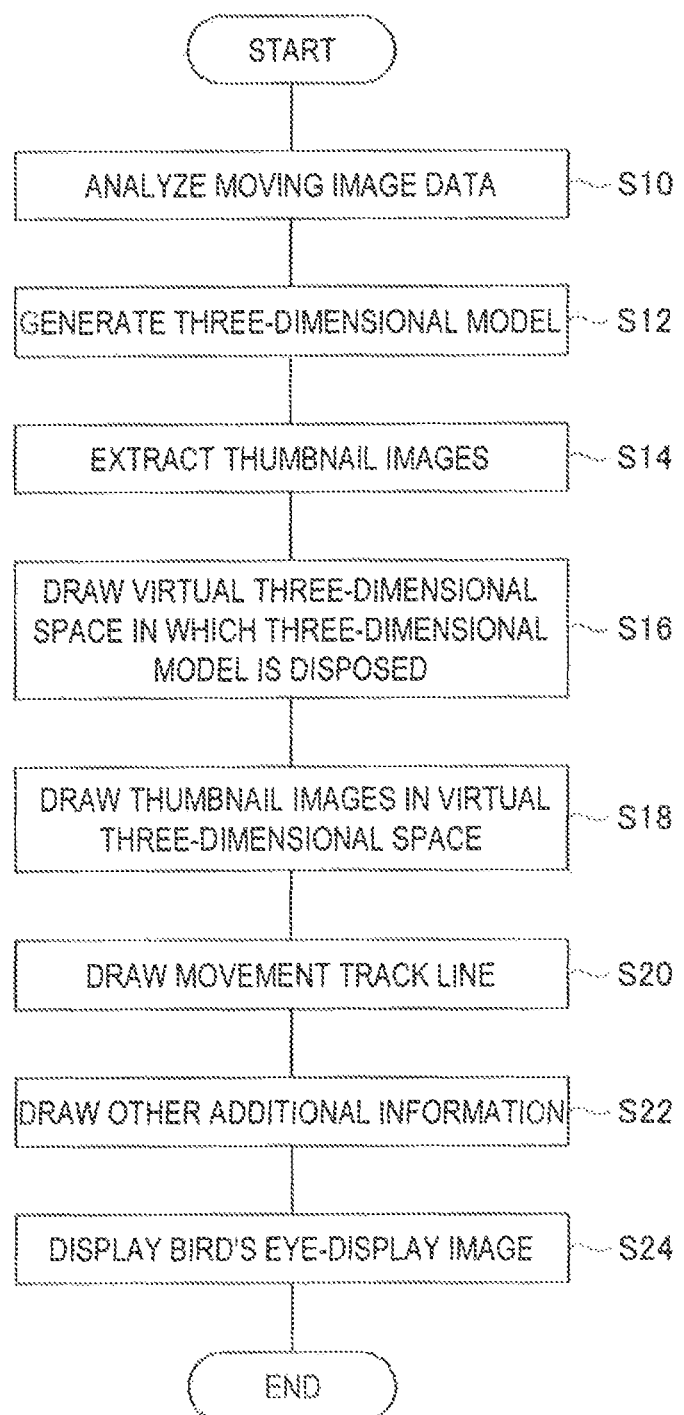
FIG. 7 is a flowchart showing a method for displaying a bird's eye-display image according to the embodiment.

Next, a description will be given of a method for displaying the bird's eye-display image 3 in the imaging device 10 according to the present embodiment with reference to FIG. 7. FIG. 7 is a flowchart showing a method for displaying the bird's eye-display image 3 according to the present embodiment.

As shown in FIG. 7, first the CPU 151 in the imaging device 10 analyzes the moving image data 21 stored in the storage unit 20 shown in FIG. 6 and data measured by the distance sensor 170 and the moving focus sensor 172 (S10). Thus, the various information and data pieces 22-29 such as shown in FIG. 6 are obtained.

Subsequently, the CPU 151 generates the three-dimensional models 4 of a plurality of objects present in the picked up moving image based on the distance map 22, the moving track information 24, and the object information 25 (S12). Further, the CPU 151 extracts a plurality of the thumbnail images 5 from the moving image data 21 in accordance with the predetermined extraction criterion (S14).

Then, the CPU 151 draws the virtual three-dimensional space 6 in which the three-dimensional models 4 of the objects generated at S12 are disposed to positions that correspond to actual positions of the objects (S16). Subsequently, the CPU 151 draws the plurality of thumbnail images 5 extracted at S14 in the virtual three-dimensional space 6 to the positions and in the directions of the imaging device 10 at the time when the thumbnail images 5 were picked up (S18). Further, the CPU 151 draws the movement track line 7 that relates the thumbnail images 5 in order in which they were picked up based on the movement track information 24 etc. (S20). It is thus possible to generate the bird's eye-display image 3 that provides a bird's-eye-view drawing of the virtual three-dimensional space 6 containing the three-dimensional models 4, the thumbnail images 5, and the movement track line 7 about the moving image obtained by performing the imaging operation once (see FIG. 1).

Further, as necessary, the CPU 151 draws additional information in the bird's eye-display image 3 based on the speech information 23, the alternative image 27, the link information 28 of the imaging information, or the subject information 29 (S22). For example, it may be permitted to draw an alternative image such as an icon or an illustration in place of the thumbnail image 5, draw a mark in the thumbnail image 5 in which a speech was detected, or draw metadata of the thumbnail image 5.

Then, the CPU 151 transmits data of the thus generated bird's eye-display image 3 to the display device 130 so that it may display the bird's eye-display image 3 on it (S24). As a result, the bird's eye-display image 3 such as shown in FIG. 1 appears on the display device 130, thereby permitting the user to appropriately grasp the picked up contents and imaging situations of the moving image.

[Display Example of Bird's Eye-display Image]

Next, a description will be given of a display example of the bird's eye-display image 3 according to the present embodiment with reference to FIGS. 8 to 14. It is to be noted that the bird's eye-display image 3 described below will be generated by the display image generation unit 60 and displayed on the display device 130 by the display control unit 70 in the above imaging device 10.

Figure 8:
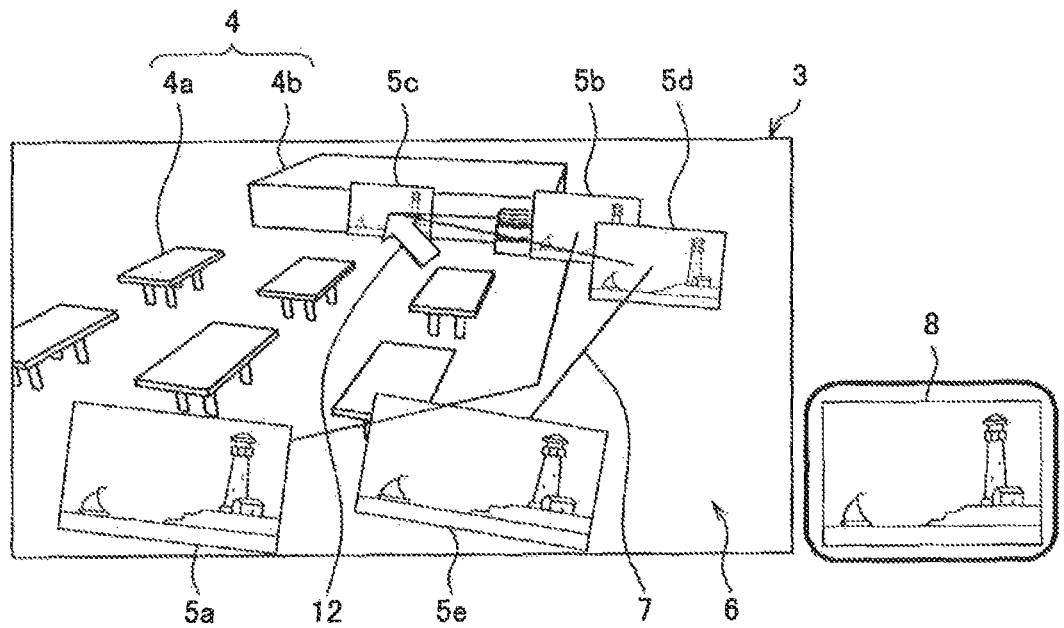
FIG. 8 shows a display example 1 of the bird's eye-display image according to the embodiment.

(1) Combination of Bird's Eye Display and Regular Playback Display (FIG. 8)

As shown in FIG. 8, the display control unit 70 provides display of a combination of the bird's eye-display image 3 and the regular playback-display image 8. If the user selects one thumbnail image 5c from the bird's eye-display image 3, the display control unit 70 regularly reproduces the moving image data 21 starting from a time that corresponds to the selected thumbnail image 5c, thus reproducing the regular playback-display image 8 as a moving image. In such a manner, by selecting the thumbnail image 5c to be confirmed desirably in the bird's eye-display image 3, the user can view the regular playback-display moving image 8 starting from that position. Thus, the user can grasp the contents of the picked up moving image more accurately.

Further, a video being reproduced and an imaging position in the regular playback-display image 8 will be displayed in such a manner that they can be distinguished from the other portions. In the shown example, an arrow-shaped pointer 12 is drawn on the thumbnail image 5c being reproduced in regular playback display. This enables the user to recognize that a video of the thumbnail image 5c and the subsequent images is being reproduced in regular playback display currently as well as its reproduction position.

Figure 9:
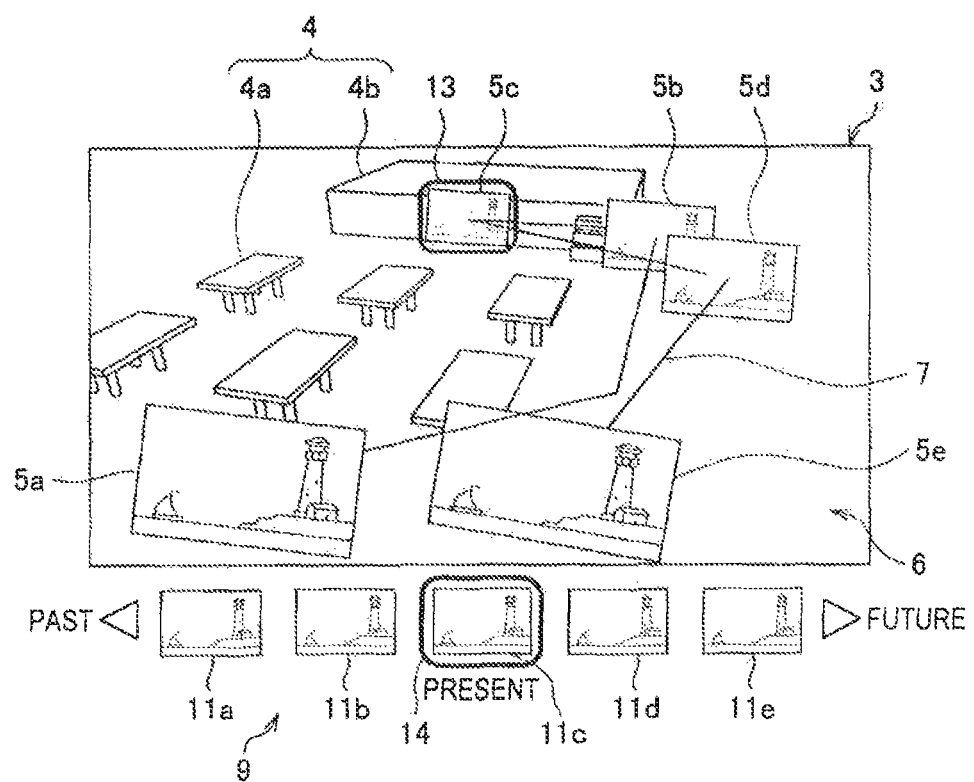
FIG. 9 shows a display example 2 of the bird's eye-display image according to the embodiment.

(2) Combination of Bird's Eye Display and Film Roll Display (FIG. 9)

As shown in FIG. 9, the display control unit 70 provides combined display of the bird's eye-display image 3 and the film roll display image 9. The thumbnail images 5a-5e of the bird's eye-display image 3 correspond to thumbnail images 11a-11e of the film roll display image 9 respectively. If the user selects one thumbnail image 5c from the bird's eye-display image 3, the display control unit 70 reproduces a video starting from the position of the thumbnail image 11c corresponding to the selected thumbnail image 5c in the film roll display image 9. In such a manner, by combining the bird's eye-display image 3 and the film roll display image 9, it is possible to display the contents of the picked up moving image, in particular, the information of the time axis t in a way more easily to understand.

Further, a video being reproduced and an imaging position in the film roll display image 9 will be displayed in such a manner that they can be distinguished from the other portions. In the shown example, the thumbnail image 5a of the bird's eye-display image 3 and the thumbnail image 11c in the film roll display image 9 are enclosed by frames 13 and 14 respectively. This enables the user to recognize that a video of the thumbnail image 5c and the subsequent images is being reproduced currently as well as its imaging position.

Figure 10:
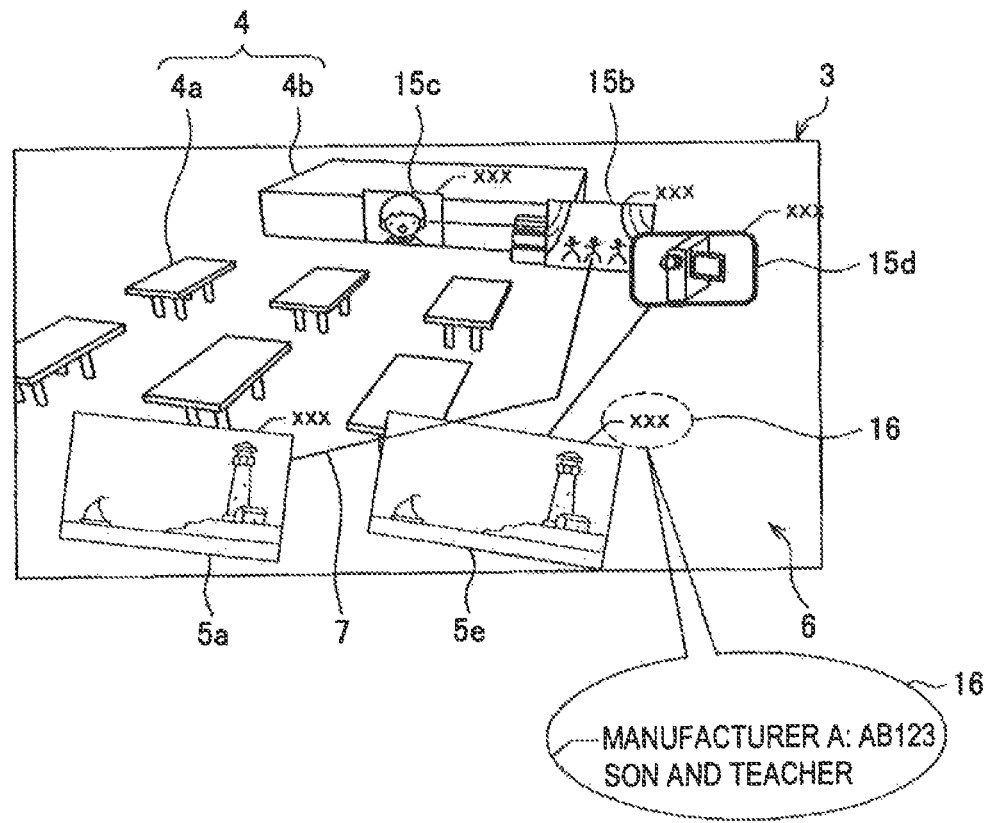
FIG. 10 shows a display example 3 of the bird's eye-display image according to the embodiment.

(3) Display of Alternative Images and Metadata in Bird's Eye Display (FIG. 10)

As shown in FIG. 10, the display control unit 70 can display an alternative image 15 indicative of the contents of imaging situations of the thumbnail image 5 such as an icon, an illustration, a still image, or a text in place of the thumbnail image 5 in the bird's eye-display image 3. Which one of the thumbnail-size 5 and the alternative image 15 should be displayed may be selected by the user arbitrarily or automatically decided by the display image generation unit 60 in accordance with the size of the thumbnail image 5.

Now, a description will be given of a specific example of the alternative image 15. For example, an alternative image 15b may be a partially expanded still image in the thumbnail image 5b (for example, cutout image of only the face of a person in the thumbnail image 5). Another alternative image 15c may be a simplified illustration of the contents of the thumbnail image 5c (for example, illustration of a subject (stage) as a whole in the thumbnail image 5c). A further alternative image 15d may be an icon representing the imaging device 10. The icon should preferably be drawn in such a manner as to indicate a direction of the imaging device 10 in which it has picked up the thumbnail image 5b. This enables the user to view the iconized alternative image 15c, thereby easily grasping an imaging direction at that position. Further, as the alternative image 15, a text (not shown) may be displayed which represents the contents of the thumbnail image 5. Such alternative images 15b, 15c, and 15d enable the user to easily grasp the contents of the thumbnail image 5.

Further, if the thumbnail image 5 is displayed too small in the bird's eye-display image 3, the thumbnail image 5 may be replaced by the alternative image 15. As described above, in the bird's eye-display image 3, bird's-eye-view display is given of the virtual three-dimensional space 6 containing the thumbnail image 5. Accordingly, the display image generation unit 60 changes the sizes of the thumbnail image 5 and the three-dimensional model 4 to be drawn in accordance with the drawings positions of the respective thumbnail image 5 and three-dimensional model 4 in the virtual three-dimensional space 6. For example, if the drawing position of the thumbnail image 5 is backward in the virtual three-dimensional space 6, it is drawn small, and if it is forward, it is drawn large. It is thus possible to provide bird's eye display of the virtual three-dimensional space 6 three-dimensionally.

However, as shown in FIG. 1, the thumbnail images 5b, 5c, and 5d are displayed small because they are drawn backward in the virtual three-dimensional space 6, so that their contents may be difficult to grasp in some cases. Therefore, the display image generation unit 60 automatically draws the above alternative images 15b, 15c, and 15d in place of the thumbnail images 5b, 5c, and 5d to be drawn if the thumbnail images 5b, 5c, and 5d take a predetermined size or less. This gives display of the alternative images 15b 15c, and 15d that simply represent the contents of the small thumbnail images 5b, 5c, and 5d. In such a manner, the user can easily grasp the imaged contents and imaging situations by viewing large the thumbnail images 5a and 5e displayed forward and the easy-to-view alternative images 15b, 15c, and 15d displayed backward in the bird's eye-display image 3.

Next, a description will be given of display of metadata 16 about the thumbnail image 5 with reference to FIG. 10 further. As shown in FIG. 10, the display control unit 70 displays various kinds of the metadata 16 accompanying the thumbnail image 5 in the bird's eye-display image 3 in a condition where the data 16 is related to the thumbnail image 5. The metadata 16 is information that represents the picked up contents and imaging conditions of the thumbnail image 5. For example, the metadata 16 may come in the above imager information 30 (name, behavior, etc.), the imaging device information 31 (manufacturer's name, type, identification information, camera setting value, operation of the imaging device 10), the subject information 29 (name, size, behavior, environment, etc. of the subject), etc. In the example of FIG. 10, as the metadata 16 are displayed a manufacturer's "Manufacturer A", a type "ABC123" of the imaging device 10 and the subject's name "Son and teacher". By analyzing the moving image data 21 and the thumbnail image 5 by using the subject estimation unit 58 and performing face recognition processing, it is possible to determine a person in the subject contained in the thumbnail image 5. It is thus possible to display the name of a subject in the thumbnail image 5 as the metadata 16 of the thumbnail image 5. By displaying such metadata 16 in a condition where it is related to the thumbnail image 5, the user can grasp the video contents and imaging situations more accurately.

Figure 11:
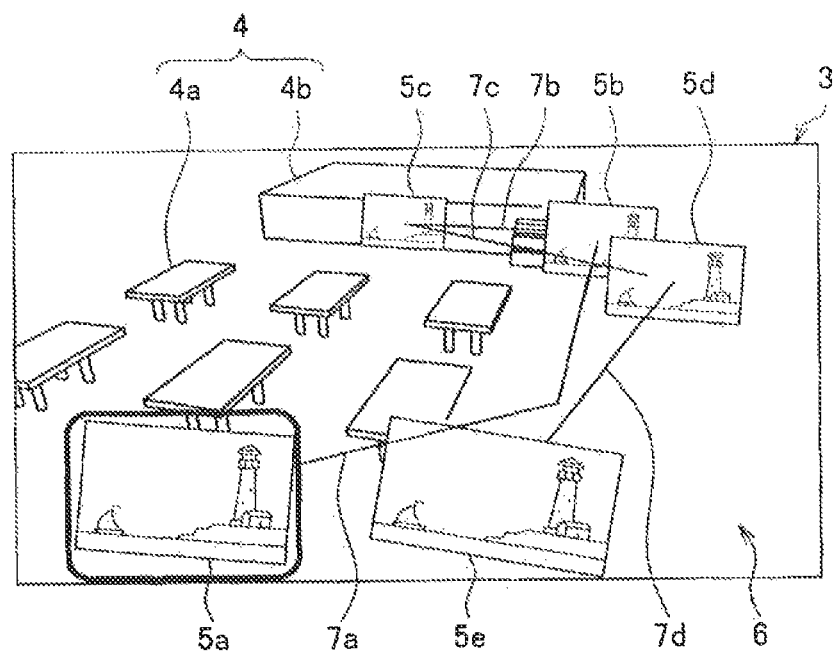
FIG. 11 shows a display example 4 of the bird's eye-display image according to the embodiment.
Figure 12:
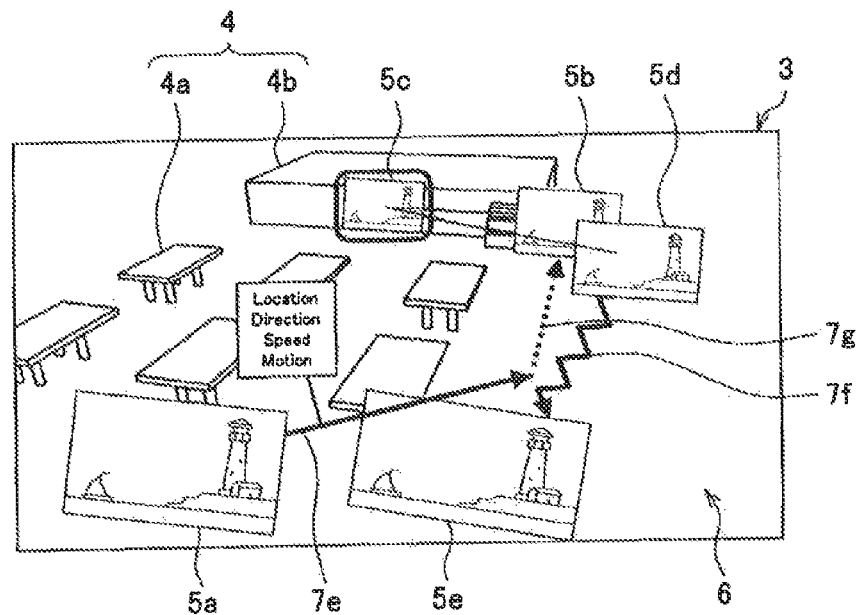
FIG. 12 shows a display example 5 of the bird's eye-display image according to the embodiment.

(4) Display of Movement Track Line 7 in Bird's Eye View Mode (FIGS. 11 and 12)

As shown in FIG. 11, the display control unit 70 thins the display interval of the thumbnail images 5 and, instead, displays movement path information of the imaging device 10. The movement path information of the imaging device 10 to be used may be, for example, the movement track line 7 interconnecting the plurality of thumbnail images 5. The movement track line 7 represents a movement track of the imaging device 10 in the virtual three-dimensional space 6 and is displayed in such a manner as to connect the thumbnail images 5 in order in which they were picked up. The movement track line 7 is one example of information that relates the plurality of thumbnail images 5 to each other in order in which they were picked up. The display image generation unit 60 draws the movement track line 7 based on the movement track information 24 obtained by the movement track sensor 172, for example. In this case, the display image generation unit 60 draws the movement track wine 7 along a movement track of the imaging device 10 at the time of actual imaging in such a manner as to connect the thumbnail images 5 in the virtual three-dimensional space 6 in order in which they were picked up.

For example, a movement track line 7a connects the thumbnail images 5a and 5b and is drawn along the movement track of the imaging device 10 at the time when it picked up a moving image of the thumbnail images 5a to 5b. Similarly, movement track lines 7b, 7c, and 7d are drawn between the thumbnail images 5b and 5c, between the thumbnail images 5c and 5d, and between the thumbnail images 5d and 5e respectively.

In such a manner, instead of displaying a lot of the thumbnail images 5 in the bird's eye-display image 3, the display interval of the thumbnail images 5 is thinned, to display the movement track line 7 (path information of the imaging device 10) connecting the thumbnail images 5 to each other. It is thus possible to exclude the redundant thumbnail images 5 and the undesirable ones picked up when the imaging device 10 was moving from the bird's eye-display image 3, thereby displaying the thumbnail images 5 in the bird's eye-display image 3 in a way easy to understand. Moreover, by connecting the thumbnail images 5 to each other with the movement track line 7, it is possible to show order in which the thumbnail images 5 were picked up (5a→5b→5c→5d→5e) and represent their interrelationship. Further, drawing the movement track line 7 as a straight line, a curved line, or a polygonal line in such a manner as to thread through between the three-dimensional models 4, it is possible to accurately represent a movement path of the imaging device 10 at the time when it picked up a moving image. By relating the thumbnail images 5 to each other with such a movement track line 7 in the bird's eye-display image 3 in order in which they were picked up, the user can grasp the contents and imaging situations of the moving image more easily and accurately.

Further, how easily the bird's eye-display image 3 can be viewed may be influenced by which imaging position in the virtual three-dimensional space 6 the thumbnail images 5 are to be displayed at and which imaging position else in the virtual three-dimensional space 6 the movement track line 7 is to be displayed at. For example, if the thumbnail images 5 are extracted from the movement image data 21 at a predetermined time interval, there is a possibility that some of the thumbnail images 5 may have a poor quality. Therefore, in the present embodiment, when extracting a plurality of the thumbnail images 5 from the movement image data 21, such good thumbnail images 5 as to be free of camera shakes because they were picked up by the imaging device 10 standing still and such thumbnail images 5 as to have a high image quality are extracted selectively. It is thus possible to display the thumbnail images 5 (picked up at rest) that provide a basic pint in an imaging scene and the thumbnail images 5 with a high image quality, thereby improving the degree of easy-to-view of the bird's eye-display image 3.

Next, a description will be given of how to represent the imaging situations and video contents by using the movement track line 7 with reference to FIG. 12. In the bird's eye-display image 3, the movement path information (for example, the movement track line 7) may be appropriately represented using a line type, a text, etc. in accordance with the operating situations and video contents of the imaging device 10 at the time of imaging. For example, as shown in FIG. 12, the movement track line 7 connecting the thumbnail images 5 to each other may be drawn using different line types with different contents and imaging situations of a moving image between the thumbnail images 5. The types of the movement track line 7 include, for example, a line shape (straight line, dotted line, broken line, knurling line, etc.), a line color, a line thickness, blinking/unblinking of the line, etc. A description will be given below of examples of changing the line type of the movement track line 7 in accordance with the contents and imaging situations of a moving image, with reference to an example of the bird's eye-display image 3 of FIG. 12.

(a) Example of Changing Line Type in Accordance with Movement Speed of the Imaging Device 10 During Photographing As shown in FIG. 12, the thumbnail images 5a and 5b are connected to each other by displayed solid-line movement track line 7e and dotted-line movement track line 7g. The dotted-line movement track line 7g represents the movement speed of the imaging device 10 at the time when it has picked up the moving image in the displayed section. In display, fir example, the thinner the dotted line is, the slower the movement speed of the imaging device 10 is. Further, the solid-line movement track line 7e indicates smooth movement of the imaging device 10 in the displayed section. The display image generation unit 60 determines the movement speed of the imaging device 10 in each of the sections based on the movement track information 24 (see FIG. 6) representing the movement loci and postures of the imaging device 10, thereby changing the line type of the movement track line 7 in accordance with the movement speed of the imaging device 10.

(b) Example of Changing Line Type in Accordance with Camera Shake Condition of Video As shown in FIG. 12, the thumbnail images 5d and 5e are connected to each other by displayed a knurling-line movement track line 7f. The knurling-line movement track line 7f represents the camera shake condition of a moving image picked up in the displayed section. In display, for example, the more knurled the line is, the larger the camera shake is. The display image generation unit 60 determines the camera shake condition of the moving image in each of the sections based on the movement track information 24 (see FIG. 6) representing the movement loci and postures of the imaging device 10, thereby changing the line type of the movement track line 7 in accordance with the camera shake condition, (c) Example of Changing Line Type (Line Color) in Accordance with Subject in Video Although not shown, a subject being shown up in a moving image in any given section can be represented using the color of the movement track line 7. For example, the blue movement track line 7 may indicate Mr. A, the red movement track line 7 may indicate Mr. B, and the spotted movement track line 7 of blue and red may indicate that Mr. A and Mr. B are both shown up. The display image generation unit 60 can determine a subject contained in a moving image in each of the sections based on the subject information 29 (see FIG. 6) obtained by analyzing the moving image (for example, face recognition), thereby changing the color of the movement track line 7 in accordance with the subject.

(d) Example of Changing Line Type (Line Thickness) in Accordance with Importance of Subject in Video Although not shown, the importance of a subject being shown up in a moving image in any given section can be represented by thickness of the movement track line 7. For example, the thicker the movement track line 7 is, the higher the importance is of the subject shown up in the video in the section. For example, the thick line indicates that Mr. C is shown up. The display image generation unit 60 determines a subject contained in a moving image in each of the sections based on the subject information 29 (see FIG. 6) obtained by analyzing the moving image (for example, face recognition), thereby changing the thickness of the movement track line 7 in accordance with the importance of the subject. The importance of the subject can be preset by the user, for example.

(e) Example of Changing Line Type (Blinking/unblinking) in Accordance with Operation Contents of Imaging Device 10

Although not shown, the operations of the imaging device 10 at the time when it picked up a moving image in each section can be represented by the display mode (for example, blinking/unblinking) of the movement track line 7. For example, if the movement track line 7 is blinking, it indicates that the lens in the imaging device 10 was zoomed during imaging of that section. The display image generation unit 60 determines the operation contents of the imaging device 10 in each of the sections based on the camera installation values contained in the imaging device information 31 (see FIG. 6) acquired during imaging, thereby changing the display mode (blinking/unblinking) of the movement track line 7 in accordance with the operation contents.

(f) Example of Changing Line Type (Additional Information Appended/not Appended to Line) in Accordance with Sound Contents Although not shown, it is possible to indicate whether a meaningful sound is recorded in a moving image in a given section by appending or not appending the additional information such as, for example, a clef "♪" to the movement track line 7. For example, if the clef is added, it indicates that a meaningful sound (for example a man's speech) other than noise and environmental sounds is recorded. The display image generation unit 60 determines the sound contents in each of the sections based on the speech information 23 (see FIG. 6) acquired by analyzing sound data, thereby appending the additional information to the movement track line 7 in accordance with the sound contents.

As thus described with reference to FIG. 12, in the bird's eye-display image 3, the movement track line 7 will be displayed in the various line types in accordance with the contents and imaging situations of a moving image between a plurality of the thumbnail images 5. This enables the user to easily and appropriately grasp the video contents or imaging situations in each of the sections in which the moving image was picked up.

Figure 13:
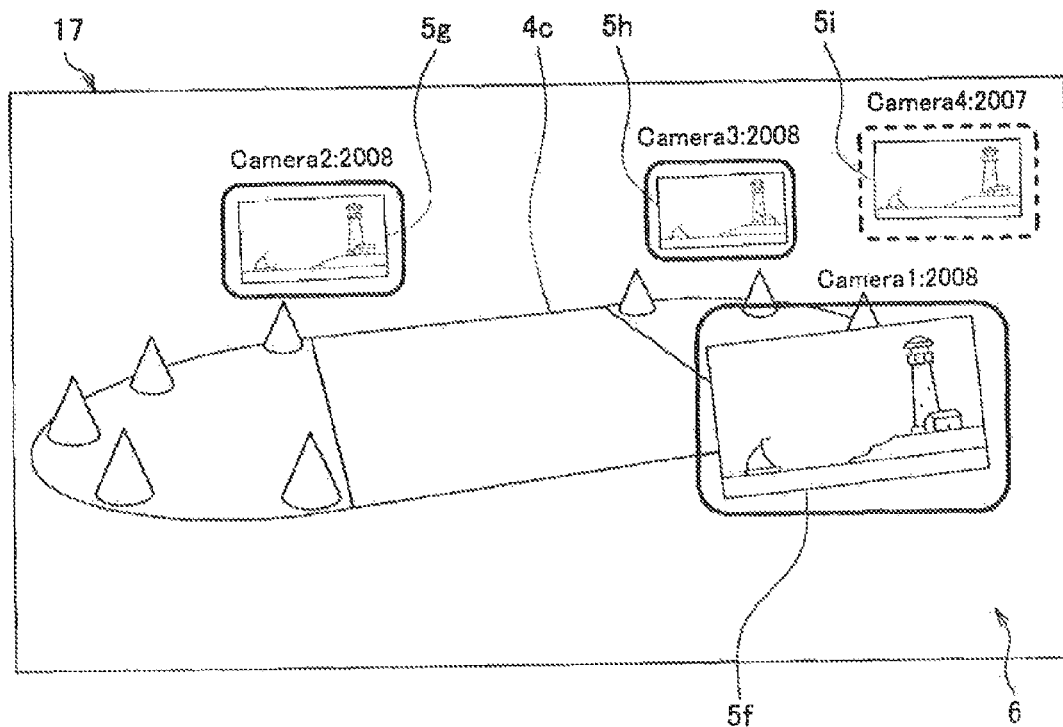
FIG. 13 shows a display example 6 of the bird's eye-display image according to the embodiment.
Figure 14:
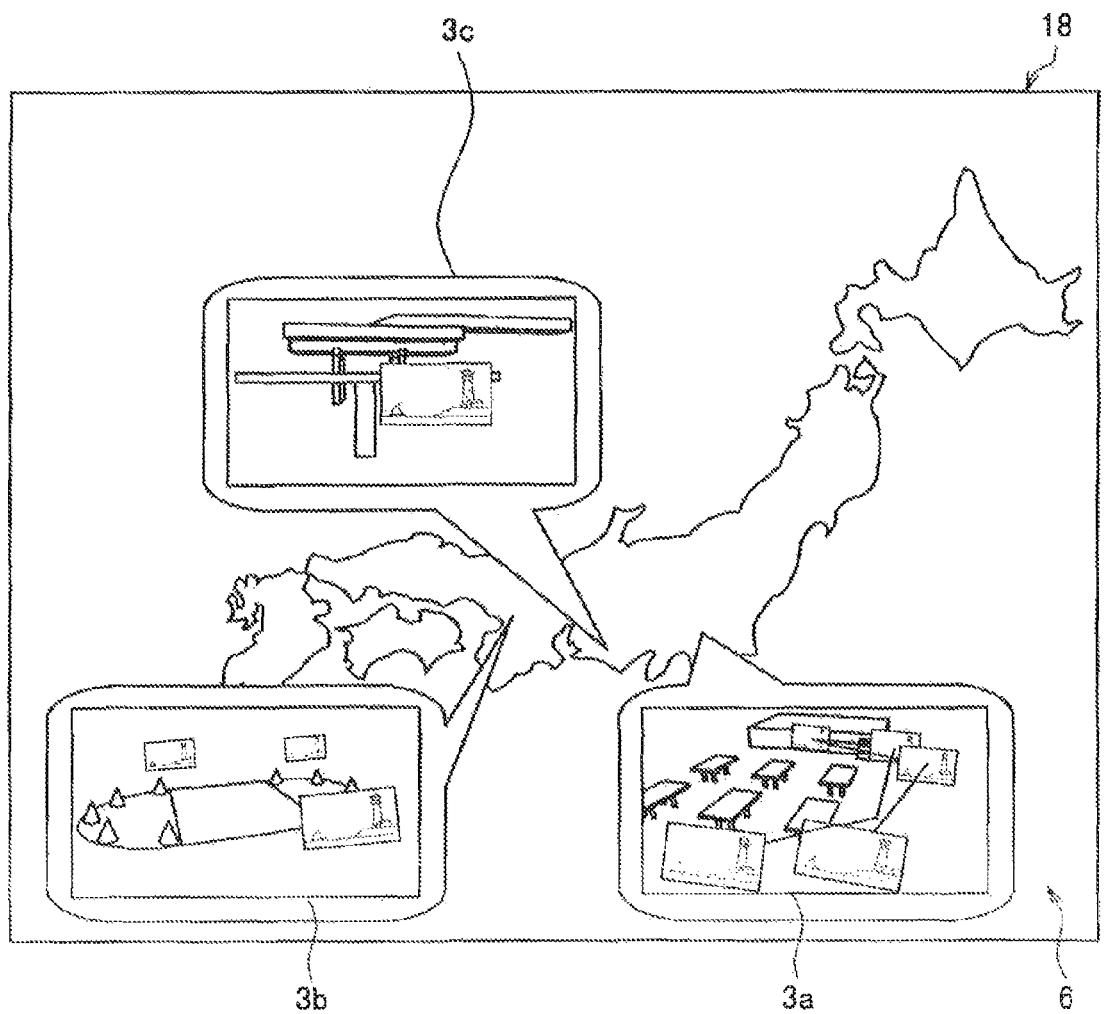
FIG. 14 shows a display example 7 of the bird's eye-display image according to the embodiment.

(5) Display of a Plurality of Moving Images in Bird's Eye View Mode (FIGS. 13 and 14)

The above examples have been described with reference to the case of providing bird's eye display of a moving image of one file (one moving image file) imaged and video-recorded by a series of imaging operations (1 rec), by using one bird's eye-display image 3. Now, a description will be given of an example of displaying a plurality of moving images picked up by the different imaging devices 10 or at different times by using one bird's eye-display image 17.

As shown in FIG. 13, the display control unit 70 can display the thumbnail images 5*f*-5*i* of a plurality of moving images picked up by the different multiple imaging devices 10 (cameras 1-4) at the same location. In the shown example, the bird's eye-display image 17 is displayed which shows appearances of a field day on the athletic ground of an elementary school. The bird's eye-display image 3 gives bird's eye display of the virtual three-dimensional space 6 containing the three-dimensional model 4*c* of a track on the athletic ground as well as the thumbnail images 5*f*-5*i* of four moving images picked up by the different multiple imaging devices 10 (cameras 1-4) on this ground. Of these, the three thumbnail images 5*f*-5*h* were picked up on the field day in 2008, while the remaining one the thumbnail image 5*i* was picked up on the field day carried out at the same location in 2007.

It is thus possible to simultaneously display the thumbnail images 5*f*-5*i* of a plurality of moving images picked up at the same location by using one bird's eye-display image 17, irrespective of differences in the imaging device 10 or imaging date/time. Thus, even if a plurality of moving images are video-recorded by performing a plurality of times of imaging operations at the same location, the multiple moving images can be displayed in the one bird's eye-display image 3 in a condition where they are related to the imaging location. Therefore, the user can accurately grasp the contents and imaging situations of the video-recorded multiple moving images in the bird' eye-display image 17. Further, they can be compared to moving images videorecorded at the same location in the past.

Moreover, the display control unit 70 can display the bird' eye-display images 17 of the plurality of moving images shown in FIG. 13 and the bird's eye-display image 3 of one such moving image as shown in FIG. 1 in a condition where they are switched with each other. For example, suppose that the user has selected one thumbnail image 5*f* from among a plurality of the thumbnail images 5*f*-51 displayed in the bird's eye-display image 17 of FIG. 13. Then, the display control unit 70 displays such a bird's eye-display image 3 as shown in FIG. 1 about the moving image of the selected thumbnail image 5*f* in place of the bird' eye-display image 17 of FIG. 13. This enables the user to grasp an overall image of a plurality of moving image files by viewing the bird' eye-display image 17 of FIG. 13, thereby confirming the details of the moving image files by viewing the bird' eye-display image 3 of FIG. 1.

Further, as shown in FIG. 14, the display control unit 70 can also couple a plurality of bird' eye-display images 3*a*-3*c* about a moving image picked up at spatially successive locations, thereby displaying one bird' eye-display image 18 that represents the virtual three-dimensional space 6 having a larger extent. This enables the user to further more easily grasp and manage a plurality of moving image files. By using the composite bird's eye-display images 17 and 18 that combine such a plurality of moving image files, a plurality of users can collectively display the gist of the plurality of moving image files picked up by the different imaging devices 10 at different times. It is thus possible to easily grasp and manage a lot of moving images.

The above display examples of the bird' eye-display image 3 according to the present embodiment have been described with reference to FIGS. 8 to 14. By using the bird' eye-display image 3 according to the present embodiment, the user can easily and accurately grasp the picked up contents and imaging situations of the moving images as a whole picked up by the imaging device 10.

<3. Second Embodiment>

Next, a description will be given of the display control apparatus and method according to the second embodiment of the present invention.

Figure 15:
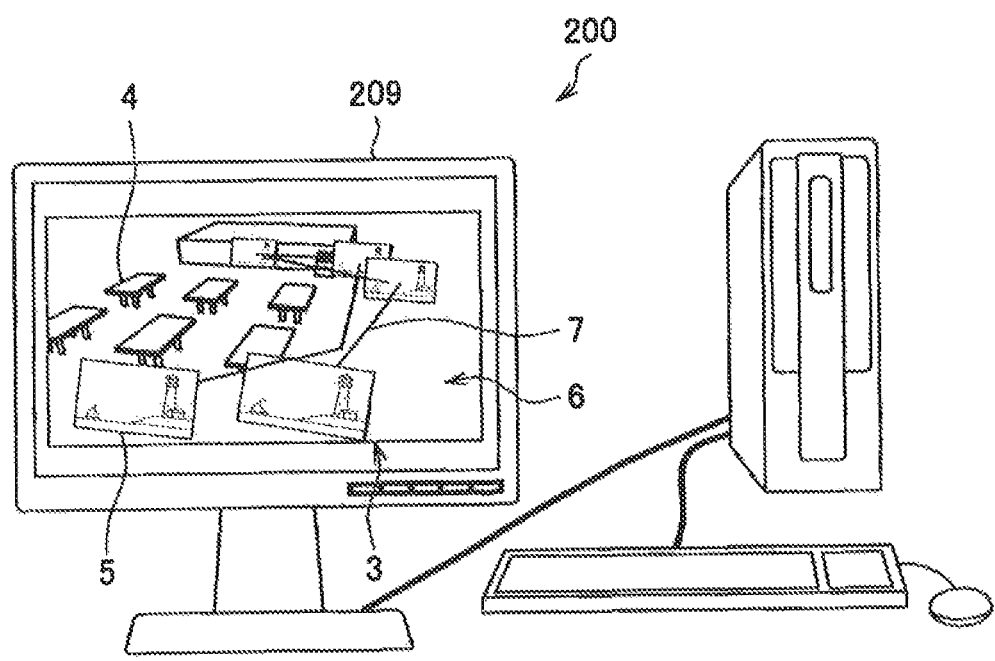
FIG. 15 shows an information processing apparatus that displays a bird's eye-display image according to a second embodiment of the present invention.

As shown in FIG. 15, the second embodiment may be an example in which the display control apparatus of the present invention has been applied to an information processing apparatus 200 (for example, a personal computer). As a playback application in the reproduction of a moving image recorded in a recording medium, the above bird's eye-display image 3 is displayed on a display device 209 in the information processing apparatus 200. For example, if the user would like to view or edit the data of a moving image picked up and video-recorded by the imaging device 10, the bird's eye-display image 3 about the data of the moving image will be displayed on the display device 209. Further, the second embodiment provides a video reproducing/editing system that adds the functions of video reproduction operations, video editing, and video retrieval to the above video display method that uses the bird's eye-display image 3.

[Hardware Configuration of Information Processing Apparatus]

Figure 16:
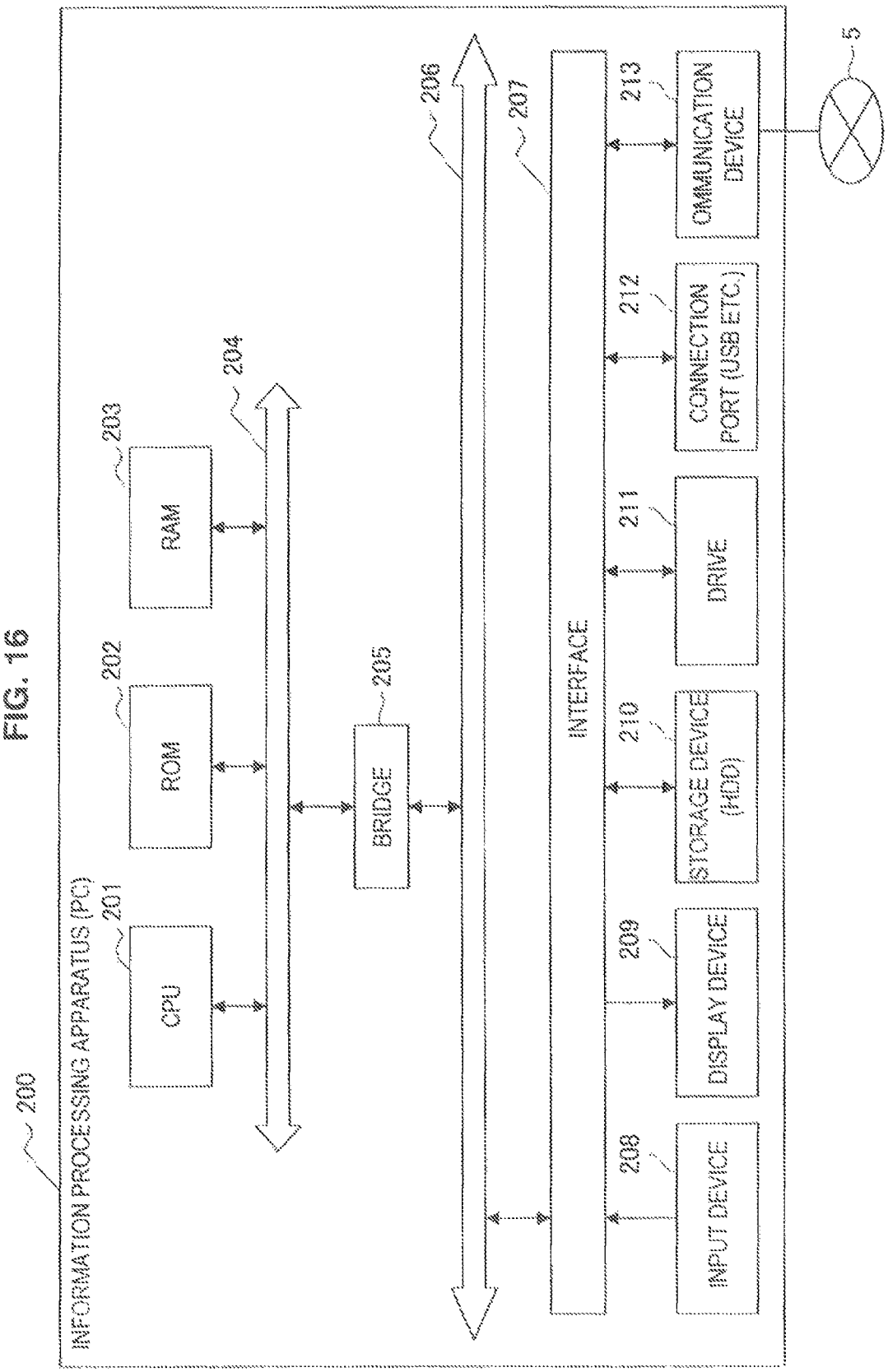
FIG. 16 is a block diagram showing a hardware configuration of the information processing apparatus according to the embodiment.

First, a description will be given of a hardware configuration of the information processing apparatus 200 according to the present embodiment with reference to FIG. 16. FIG. 16 is a block diagram showing the hardware configuration of the information processing apparatus 200 according to the present embodiment.

As shown in FIG. 16, the information processing apparatus 200 includes, for example, a CPU 201, an ROM 202, an RAM 203, a host bus 204, a bridge 205, a external bus 206, and an interface 207. The information processing apparatus 200 further includes an input device 208, the display device 209, a storage device (HDD) 210, a drive 211, a connection port 212, and a communication device 213. In such a manner, the information processing apparatus 200 can include a general purpose computer apparatus (for example, PC).

The CPU 201 functions as an arithmetic processing apparatus and a control apparatus, to operate in accordance with various programs, thus controlling the units in the information processing apparatus 200. The CPU 201 performs various kinds of processing in accordance with a program stored in the ROM 202 or a program loaded from the storage device 210 to the RAM 203. The ROM 202 stores the program and arithmetic parameters used by the CPU 201 and functions as a buffer to reduce accesses placed to the storage device 210 from the CPU 201. The RAM 203 temporarily stores the program used by the CPU 201 when it performs the processing and the parameters etc. which changes appropriately during the performance. Those are connected to each other by the host bus 204 constituted of a CPU bus etc. The host bus 204 is connected to an external bus 206 such as a peripheral component interconnect/interface (PCI) bus via the bridge 205.

The input device 208 includes, for example, operation means such as a mouse, a keyboard, a touch panel, a button, a switch, or a lever and an input control circuit to generate an input signal and send it to the CPU 201. The display device 209 includes, for example, a liquid crystal display (LCD), an organic EL display, a plasma display, a cathode ray tube (CRT) display etc. Further, it is equipped also with a sound output device (not shown) such as a speaker.

The storage device 210 is used to store various kinds of data and constituted of, for example, an external device such as an HDD or a built-in disk drive. The storage device 210 drives a hard disk, which is a recording medium, to store in it the program executed by the CPU 201 and various kinds of data. The drive 211 is used to carry out read and write operations to the recording medium and built in or externally mounted to the information processing apparatus 200. The drive 211 performs write/read operations of various kinds of data to a removable recording medium such as, for example, a magnetic disc, an optical disc, a magneto-optical disc, or a semiconductor memory loaded into the information processing apparatus 200.

The connection port 212 is used to connect an external peripheral device and has a connection terminal such as, for example, a USB or an IEEE1394. The connection port 212 is connected to the CPU 201 etc. via the interface 207, the external bus 206, the bridge 205, or the host bus 204. The communication device 213 is a communication interface constituted of, for example, a communication device to connect to a network. The communication device 213 transmits various kinds of data to and receives them from an external device having network communication functions, via the network.

For example, the information processing apparatus 200 can acquire moving image data 21 and its additional information from the imaging device 10 having the network communication functions or any other device, via the network. Further, the information processing apparatus 200 can acquire the moving image data 21 obtained by the imaging device 10 and its additional data etc. from a recording medium recording the data.

[Functional Configuration of Information Processing Apparatus]

Figure 17:
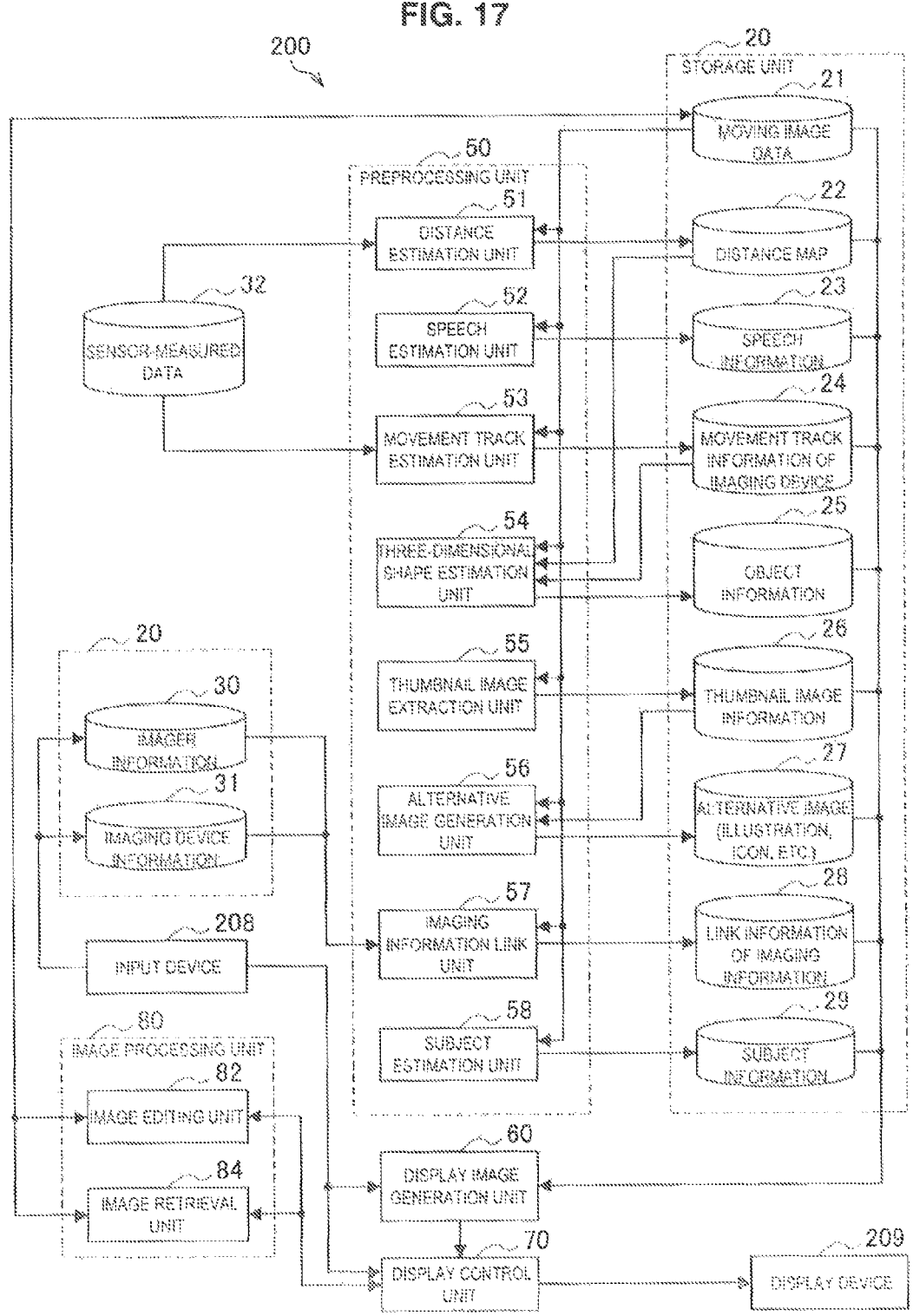
FIG. 17 is a block diagram showing a functional configuration of the information processing apparatus according to the embodiment.

Next, a description will be given in detail of the functional configuration of the information processing apparatus 200 according to the present embodiment with reference to FIG. 17. FIG. 17 is a block diagram showing the functional configuration of the information processing apparatus 200 according to the present embodiment. It is to be noted that FIG. 17 schematically shows the functional units that are used to display the bird's eye-display image 3, which features the present embodiment.

As shown in FIG. 17, the information processing apparatus 200 includes a storage unit 20, a preprocessing unit 50, a display image generation unit 60, the display control unit 70, an image processing unit 80, the display device 209, and the input device 208. Of these, the preprocessing unit 50, the display image generation unit 60, the display control unit 70, and the image processing unit 80 are realized by, for example, software installed in the information processing apparatus 200. That is, for example, the CPU 201 shown in FIG. 16 operates in accordance with the program stored in the ROM 202 etc., thereby functioning as the preprocessing unit 50, the display image generation unit 60, the display control unit 70, and the image processing unit 80. It is to be noted that the program can be provided to the information processing apparatus 200 via a recording medium or a network.

In contrast to the above imaging device 10 (FIG. 5) according to the first embodiment, the information processing apparatus 200 (FIG. 17) according to the second embodiment is not equipped with the imaging processing unit 40, the distance sensor 170 nor the movement track sensor 172 but includes the image processing unit 80. Except for the difference, the second embodiment is the same as the first embodiment, and repetitive description will be omitted on the identical components of the storage unit 20, the preprocessing unit 50, the display image generation unit 60, and the display control unit 70.

As shown in FIG. 17, the information processing apparatus 200 acquires moving image data 21, imager information 30, imaging device information 31, and sensor-measured data 32 via a recording medium or a network from any other device such as the imaging device 10 and stores them in the storage unit 20. The sensor-measured data 32 corresponds to data measured by the distance sensor 170 or the moving track sensor 172 described in FIG. 6.

Similar to the first embodiment, the preprocessing unit 50 generates various kinds of information and data pieces 22-29 based on input data such as the moving image data 21 and the sensor-measured data 32. It is to be noted that if the information processing apparatus 200 can acquire those information and data pieces 22-29 from external device such as the imaging device 10, the preprocessing unit 50 is unnecessary.

Further, if the sensor-measured data 32 may not be obtained from the imaging device 10, a movement track estimation unit 53 in the preprocessing unit 50 may analyze the moving image data 21, to estimate a movement track, a posture, etc. of the imaging device 10 at the time of imaging.

Further, a three-dimensional shape estimation unit 54 may analyze the moving image data 21, to identify and extract an object contained in a video represented by the moving image data 21, thereby estimating its three-dimensional shape, position, etc.

Similar to the first embodiment, the display image generation unit 60 generates a bird's eye-display image 3, which is then displayed by the display control unit 70 on the display device 209.

The image processing unit 80 processes (edits, generates, retrieves, etc.) an image such as the moving image data 21 in response to an input operations by the user on the input device 208. The image processing unit 80 includes an image editing unit 82 and an image retrieval unit 84.

The image editing unit 82 edits the moving image data 21 in response to user operations on a three-dimensional model 4 or a thumbnail image 5 in the bird's eye-display image 3 shown on the display device 209. This enables the user to edit a video only by dragging and dropping the edit-target three-dimensional model 4 or thumbnail image 5 on the bird's eye-display image 3, thus facilitating the editing job. The details of such editing processing will be described later (see FIGS. 18 and 19).

Further, the image editing unit 82 generates an image based on the moving image data 21 in response to user operations on the bird's eye-display image 3 shown on the display device 209. For example, if an angle of the moving image is specified by the user in the bird's eye-display image 3, the image editing unit 82 processes the moving image data 21 in accordance with the specified angle, thus generating the data of the moving image as viewed at the angle. The details of such angle changing processing will be described later (see FIG. 20).

The image retrieval unit 84 retrieves any other three-dimensional model 4 which is the same as or similar to that selected by the user from the bird's eye-display image 3 shown on the display device 209 or an image containing the three-dimensional model 4. The image retrieval unit 84 can retrieve the three-dimensional model 4 by specifying not only its shape but also its color and size. Further, the image retrieval unit 84 can perform retrieval by use of the three-dimensional model 4 among a plurality of pieces of the moving image data 21. The details of such retrieval processing will be described later (see FIG. 21).

[Display Example of Bird's Eye-display Image]

Next, a description will be given of a display example of the bird's eye-display image 3 according to the present embodiment with reference to FIGS. 18 to 23. Moving images video-recorded by a recorder such as the imaging device 10 have commonly been viewed, edited, and retrieved using the information processing apparatus 200. In the following, a description will be given of the display examples of applying the bird's eye-display image 3 to the viewing, editing, and retrieval of such moving images.

Figure 18:
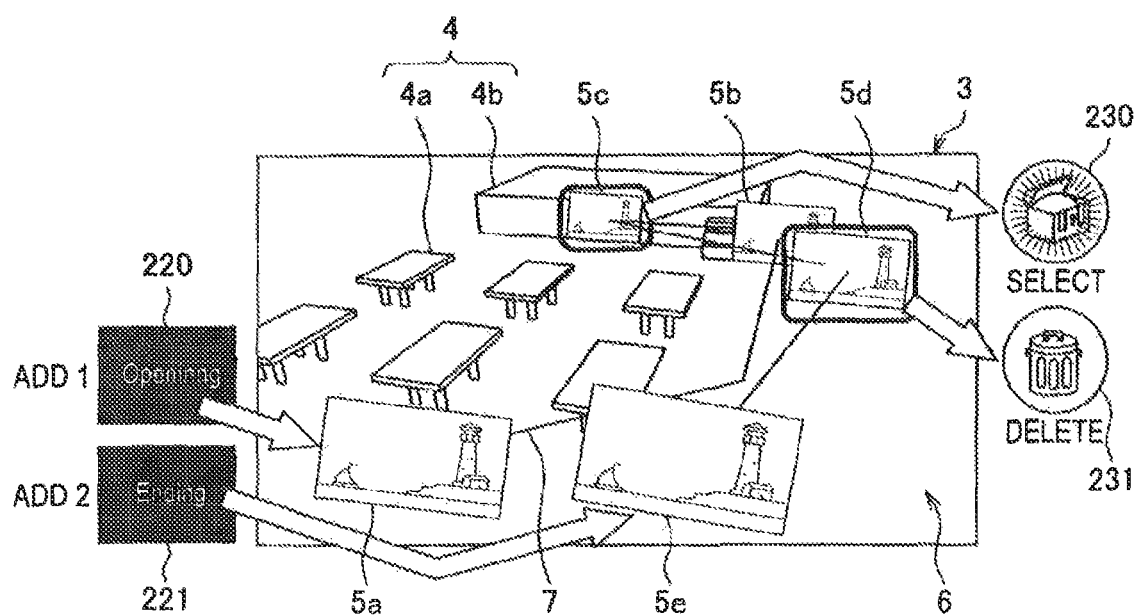
FIG. 18 shows a display example 1 of the bird's eye-display image according to the embodiment.

(1) Video Editing to Add/delete Image (FIG. 18)

As shown in FIG. 18, the display control unit 70 displays the bird's eye-display image 3 about a given moving image as well as icons 220 and 221 indicative of additional images and icons 230 and 231 indicative of selection or deletion of a scene on the display device 209. The additional images may be any one of a moving image and a still image.

First, a description will be given of additional editing of an image to the existing moving image. The user can edit the moving image by dragging and dropping the icons 220 and 221 indicative of the images of a scene to be added desirably, onto the thumbnail image 5 in the bird's eye-display image 3. When the post-editing moving image ids reproduced, the images of the added scene will be reproduced in order in which they were added.

Describing in more detail, the example shown in FIG. 18 displays the icon 220 indicative of the image of an opening scene and the icon 221 indicative of the image of an ending scene on the left side of the bird's eye-display image 3. The user drags and drops the icon 220 of the opening scene onto the top thumbnail image 5*a* and the icon 221 of the ending scene onto the last thumbnail image 5*a*. In response to such user operations, the image editing unit 82 adds the image of the opening scene to the top of the moving image given by the thumbnail images 5*a*-5*e* and the image of the ending scene to the end of the moving image. In such a manner, the user can edit a video by performing simple operations in the bird's eye-display image 3.

Next, a description will be given of selecting and deleting of a scene in a moving image. The user can edit a moving image by dragging and dropping the thumbnail image 5 in the bird's eye-display image 3 onto the icons 230 and 231 indicative of scene selection and deletion respectively. When the post-editing moving image is reproduced, the selected scenes will be reproduced, but not the deleted scenes.

Describing in more detail, the example shown in FIG. 18 displays the icon 230 indicative of scene selection and the icon 231 indicative of scene deletion on the right side of the bird's eye-display image 3. The user selects a scene containing the thumbnail image 5*c* by dragging and dropping the thumbnail image 5*c* onto the selection icon 230. Further, the user deletes a scene containing the thumbnail image 5*c* by dragging and dropping the thumbnail image 5*c* onto the deletion icon 231. In response to such user operations, the image editing unit 82 edits the original moving image in such a manner that the scene containing the thumbnail image 5*c* may be left or deleted. By such scene selection and deletion by use of the thumbnail image 5, the moving image in a predetermined section containing the thumbnail image 5 is selected or deleted.

In such a manner, the user can edit a video by selecting and deleting scenes of a moving image through simple operations on the bird's eye-display image 3. Further, after editing, in the bird's eye-display image 3, a movement track line 7 corresponding to the deleted scene may be expressed as a dotted line or the thumbnail image 5 of the scene may be made semitransparent. This enables the user to recognize that some scenes in the moving image have been deleted.

Figure 19:
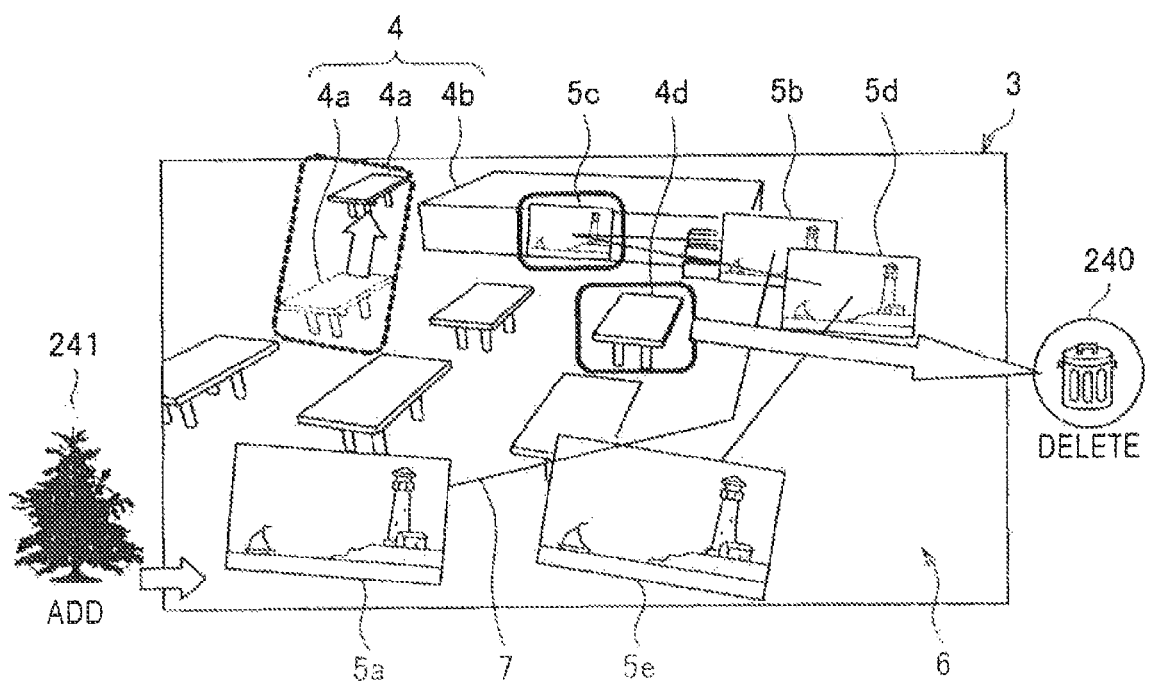
FIG. 19 shows a display example 2 of the bird's eye-display image according to the embodiment.

(2) Video Editing by Use of Three-dimensional Model (FIG. 19)

As shown in FIG. 19, the display control unit 70 causes the display device 209 to display the bird's eye-display image 3 about a given moving image as well as an icon 240 indicative of selection or deletion of the three-dimensional model 4 and an icon 241 indicative of an object of a three-dimensional model to be added desirably.

First, a description will be given of video editing by use of deletion of the three-dimensional model 4 from the bird's eye-display image 3. The user can edit a moving image by dragging and dropping a three-dimensional model 4*d* in the bird's eye-display image 3 onto the icon 240 indicative of three-dimensional model deletion. In response to such user operations, the image editing unit 82 deletes the image portion of an object corresponding to the deleted three-dimensional model 4, to supplement an appropriate image by utilizing images around the deleted portion and those before and after the deletion. As a result, when the post-editing moving image is reproduced, the image of the object (right backward table in the example of the figure) corresponding to the deleted three-dimensional model 4d is not shown and the resultant empty portion is filled with a drawing of the appropriate image by use of the surrounding time-wise and space-wise information. By thus editing a video utilizing the three-dimensional model 4, persons and objects undesirably imaged during photographing can be easily selected and deleted.

Next, a description will be given of video editing by use of addition of the three-dimensional model 4 to the bird's eye-display image 3. The user can edit a moving image by dragging and dropping the icon 241 indicative of the object of a three-dimensional model to be added desirably onto any given portion in the bird's eye-display image 3. In response to such user operations, the image editing unit 82 draws an image (Christmas tree in the shown example) of the object corresponding to the added three-dimensional model 4 to a specified position. As a result, when the post-editing moving image is reproduced, the image corresponding to the added three-dimensional model 4 is drawn to the position where the icon was dropped so that it may be added, thereby avoiding drawing of a background image of a portion hidden by the added image.

Next, a description will be given of video editing by use of movement of the three-dimensional model 4. The user can edit a moving image by dragging and dropping an arbitrary three-dimensional model 4a in the bird's eye-display image 3 onto any given portion of the bird's eye-display image 3. In response to such user operations, the image editing unit 82 deletes an image (upper left table in the shown example) of the object corresponding to the moved three-dimensional model 4a at the original position and draws it to a movement-destination position. At the original position, the image editing unit 82 supplements an appropriate image by utilizing images around the deleted portion and those before and after the deletion. As a result, when the post-editing moving image is reproduced, the object of the three-dimensional model 4a is drawn to the movement-destination position, but not to the original position.

In such a manner, the user can edit a video by adding, deleting, and moving the three-dimensional model 4 through simple operations on the bird's eye-display image 3.

Figure 20:
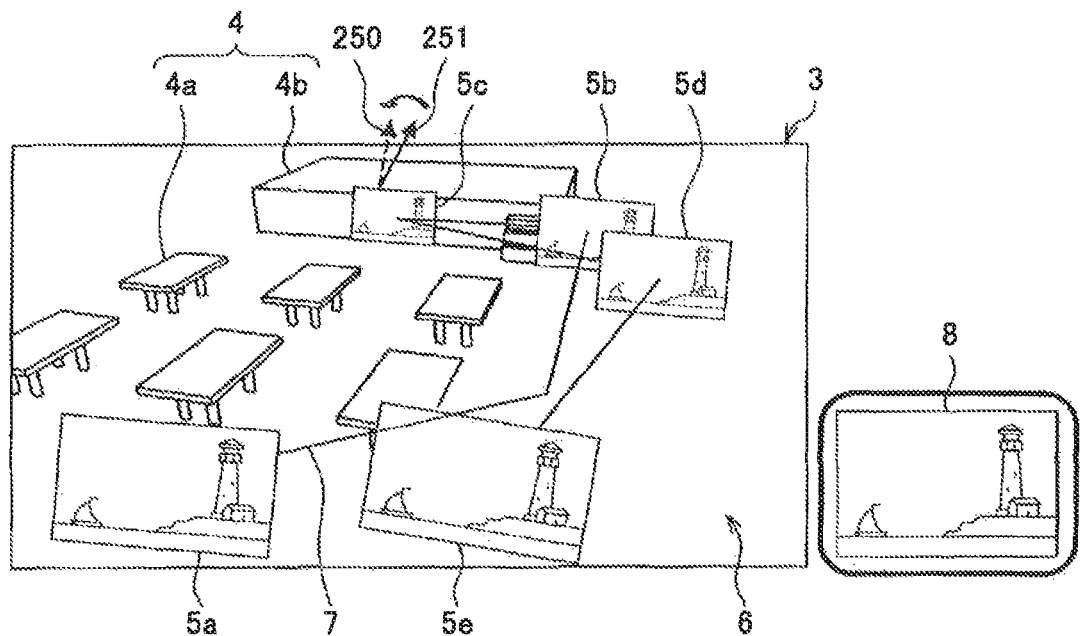
FIG. 20 shows a display example 3 of the bird's eye-display image according to the embodiment.

(3) Video Editing by Means of Angle Specification (FIG. 20)

As shown in FIG. 20, the user can adjust an angle-specification arrow 250 in the bird's eye-display image 3, thereby specifying an angle (arrow 251) different from an angle (arrow 250) at the time when a moving image was picked up. The angle means a camera angle (viewpoint) at which a subject was imaged. In accordance with the specified angle, the image editing unit 82 performs image processing on the moving image data 21, thereby generating data of the moving image as viewed at the angle. As a result, when the video is reproduced, the moving image (the regular playback-display image 8) viewed at the specified angle is generated and displayed. In such a manner, the user can easily specify a desired angle so that the information processing apparatus 200 can generate and display a moving image having the angle as its viewpoint. By thus viewing a moving image at a different angle, the user can more accurately grasp the contents and imaging situations of the moving image.

Figure 21:
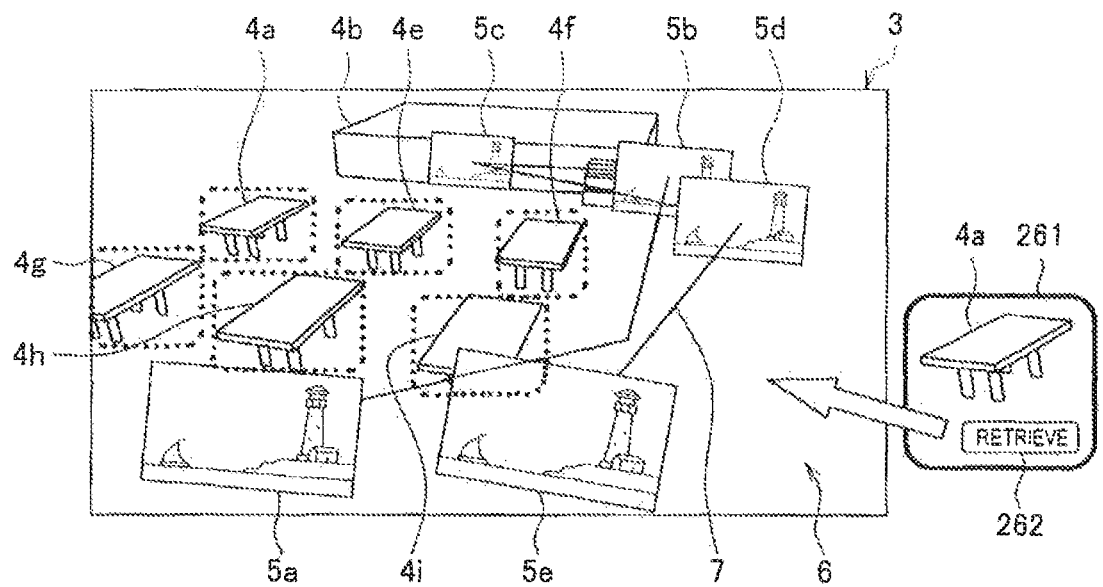
FIG. 21 shows a display example 4 of the bird's eye-display image according to the embodiment.

(4) Image Retrieval by Use of Three-Dimensional Model (FIG. 21)

AS shown in FIG. 21, the user can select any given three-dimensional model 4a in the bird's eye-display image 3 and retrieve three-dimensional models 4e-4i that are the same as or similar to the three-dimensional model 4a. In more detail, first the user selects one three-dimensional model 4a in the bird's eye-display image 3. Then, the image retrieval unit 84 displays the selected three-dimensional model 4a in a retrieval window 261. If the user presses a retrieval button 262, the image retrieval unit 84 retrieves the three-dimensional models 4e-4i similar to the selected three-dimensional model 4a and further searches an entirety of the moving image for an image portion containing objects represented by the retrieved three-dimensional models 4e-4i. Thus, the user can easily retrieve a video in which a desired object (subject) is shown up.

Further, by specifying not only the shape of the three-dimensional model 4 but also its color and size, it is possible to retrieve an image containing similar three-dimensional models 4. It is also possible to retrieve similar images by using the three-dimensional model 4 across a plurality of moving images.

Further, the user can select any given three-dimensional model 4 in the bird's eye-display image 3 and add meta-information to the three-dimensional model 4. The image retrieval unit 84 can retrieve the three-dimensional model 4 based on that meta-information, thereby retrieving images that contain the three-dimensional model 4. It is also possible to retrieve similar images by using the meta-information of the three-dimensional model 4 across a plurality of moving images.

As described above, the bird's eye-display image 3 shows the three-dimensional model 4 of an object in a moving image so that the three-dimensional model 4 can be suitable utilized as a retrieval condition. By retrieving a similar image or a related image by using the three-dimensional model 4 as the retrieval condition, the user can easily and quickly find out a desired image.

Figure 22:
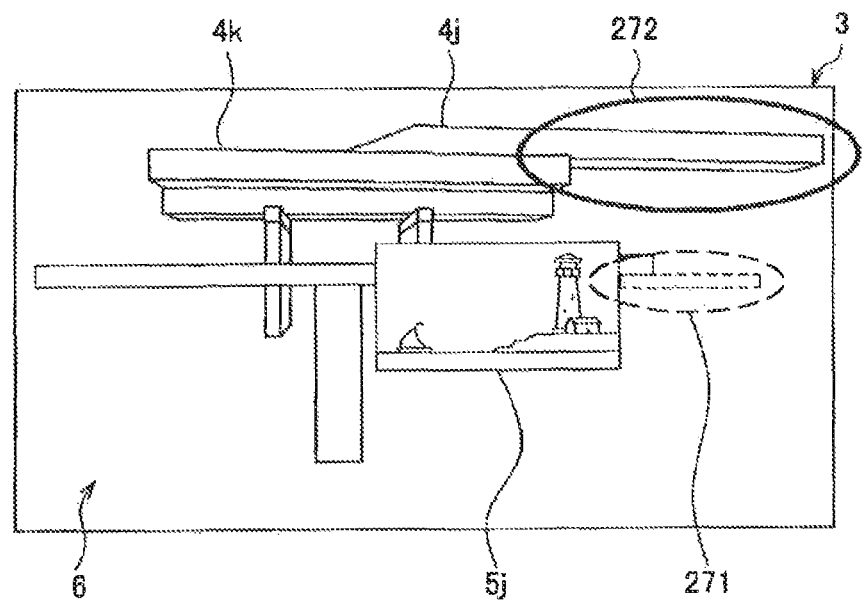
FIG. 22 shows a display example 5 of the bird's eye-display image according to the embodiment.
Figure 23:
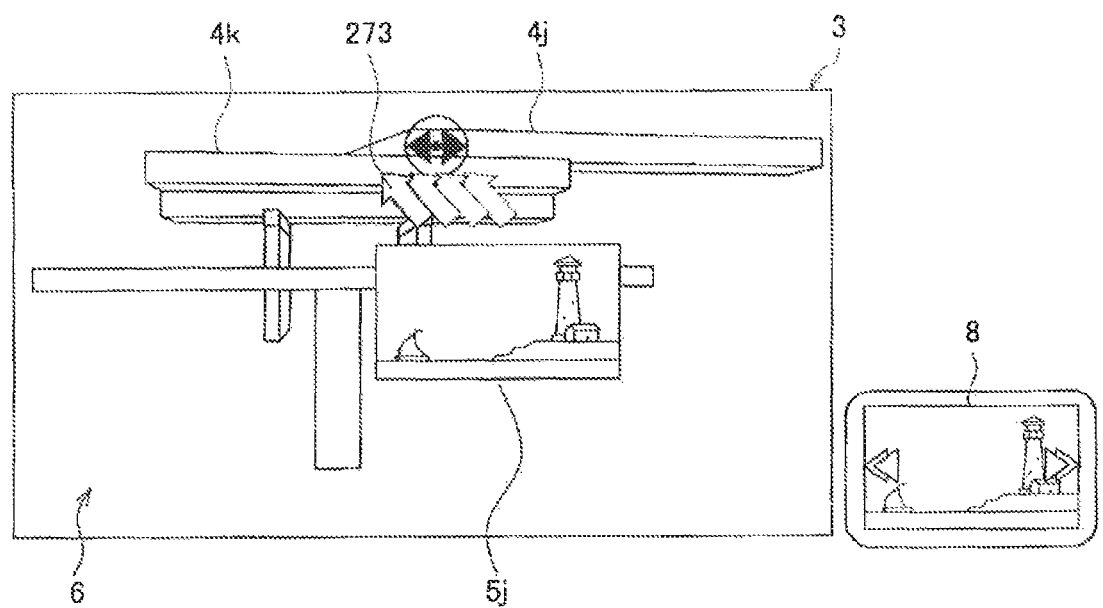
FIG. 23 shows a display example 6 of the bird's eye-display image according to the embodiment.

(5) Bird's Eye Display of Subject Containing Movable Body (FIGS. 22 and 23)

FIG. 22 shows the bird's eye-display image 3 in a case where a subject containing a movable body (for example, train) is imaged from a fixed point. In this case, the movable body may be, for example, the shown vehicle (for example, train), an animal, a person, etc. The display control unit 70 displays a three-dimensional model 4j of the movable body and a three-dimensional model 4k of any other object (for example, elevated bridge) as well as the bird's eye-display image 3 containing one thumbnail image 5j photographed at an arbitrary time. In this case, since the movable body moves in the moving image as time elapses, an issue occurs on which position in the virtual three-dimensional space 6 the three-dimensional model 4j of the movable body should be drawn at.

In the shown example, the display image generation unit 60 draws the three-dimensional model 4j of the movable body to the position at a given imaging time, to draw the thumbnail image 5j at the imaging time. In this case based on the moving image as a whole, the display image generation unit 60 fills the movable body's portion 271 not shown up in the thumbnail image 5j at the imaging time, thus drawing the three-dimensional model 4j of the movable body. A portion 272 enclosed by a slid-line ellipsoid in FIG. 22 is the filled portion in the three-dimensional model 4j of the movable body. In such a manner, the user can appropriately grasp the contents of the moving image picked up from the fixed point, especially, the position and the size of the movable body.

Further, as shown in FIG. 23, the user can control the reproduction time in the regular playback-display image 8 by selecting three-dimensional model 4j of the movable body in the bird's eye-display image 3 using a pointer 273 and dragging (that is, moving) the three-dimensional model 4j.

That is, if a movable body is imaged in such a manner, there is an association between the position of the movable body and the reproduction time in the moving image. Accordingly, if the three-dimensional model 4j of the movable body is moved in the bird's eye-display image 3 by the user, the display control unit 70 controls the reproduction time, reproduction direction, and reproduction speed in the regular playback-display image 8 in accordance with the position, movement direction, and movement speed of the three-dimensional model 4j. In the example of FIG. 23, if the three-dimensional model 4j is moved from the right to the left, the regular playback-display image 8 is reproduced in as positive reproduction direction. By thus interlocking movement of the three-dimensional model 4 of the movable body and regular playback display with each other, the user can provide regular playback display of the moving image at a desired reproduction time, in a desired direction, and at a desired reproduction speed through simple operations, thereby appropriately grasping the contents of that moving image.

<Effects>

Thus, the display control apparatus and display method for displaying a bird's eye-display image according to the first and second embodiments of the invention has been described. The regular playback display in related art (FIG. 2) and film roll display (FIG. 3) have had an issue that they would require a lot of time and labor to grasp the picked up contents of a moving image and, further, could not grasp the imaging situations.

In contrast, according to the bird's eye-display image 3 according to the present embodiments, the three-dimensional model 4 of an object is drawn to its actual position in the virtual three-dimensional space 6 and to a position and in a direction at the time when a plurality of the thumbnail images 5 were picked up. Moreover, as information to relate the thumbnail images 5 to each other, the movement track line 7 interconnecting the plurality of thumbnail images 5 in order in which they were picked up is drawn along a movement track of the imaging device 10. Then, the bird's eye-display image 3 provides bird's eye display of the virtual three-dimensional space 6 containing the thumbnail images 5 and three-dimensional model 4, thus making it easy to grasp the picked up contents and imaging situations by utilizing the movement path of the imaging device 10 and the association between the thumbnail images 5.

Accordingly, the user can easily and instantaneously grasp not only the contents of an imaged video (moving image) but also the imaging situations. Thus, the user can efficiently classify, arrange, and edit a plurality of videos recorded by the imaging device 10. As a result, it is possible to overturn the status quo in which a lot of videos are stocked at the user so that the user may not know what to do with them.

Further, besides such easy grasping of video contents, in video editing also, the user can very easily and quickly reproduce, retrieve, and edit the videos through simple operations such as drag-and-drop operations. Therefore, the even users who have hesitated editing because it is troublesome can utilize the present invention readily.

The future progress of the imaging device can surely be expected to aim at the addition of a function to acquire three-dimensional information, while the video display method according to the present embodiments has a very high affinity with the function. Further, a recent-year progress in information processing apparatuses and image analyzing technologies has improved a capability of automatically extracting the three-dimensional information from a video. Therefore, the video display method according to the present embodiments can accommodate also the assets of videos in related art whose three-dimensional information is yet to be acquired at the time of photographing.

It should be understood by those skilled in the art that various modifications, combinations, sub-combinations and alterations may occur depending on design requirements and other factors insofar as they are within the scope of the appended claims or the equivalents thereof.

For example, the above embodiments have applied the display control apparatus to the imaging device 10 (digital video camera) or the information processing apparatus 200 (PC), the present invention is not limited to them. For example, of course, the display control apparatus of the present invention can be applied to a variety of imaging devices including a digital still camera and a monitor camera and any given devices having an imaging function such as a cell phone with a camera and the like. Further, it can be applied to any given electronic devices as far as they have a video reproduction function although it has no imaging functions. They may include a video recording/reproduction apparatus such as a blu-ray disc/DVD/HDD player, a personal digital assistant (PDA), a portable video player, a game machine, and a TV receiver.

Further, the above embodiments have been described with reference to the case where the individual user would photograph personal contents (self-recording video), the bird's eye display method of the present invention can be applied to a wide range field including the production of a broadcast programs and video media.

Further, the device for displaying the bird's eye-display image 3 of the present invention is not limited to two-dimensional monitors. For example, by using a three-dimensional monitor, the bird's eye-display image can be reproduced in a more steric manner.

Further, although the above embodiments have displayed the movement track line 7 as the information to relate the thumbnail images 5 to each other in order in which they were picked up, the present invention is not limited to it. For example, as this information, text information indicative of the order in which the thumbnail images 5 have been picked up may be displayed or the marks and icons may be displayed in such a manner as to move along a movement pass of the imaging device 10 in the bird's eye-display image 3.

The present application contains subject matter related to that disclosed in Japanese Priority Patent Application JP 2008-264112 filed in the Japan Patent Office on 10Oct. 2008, the entire content of which is hereby incorporated by reference.

What is claimed is:

1. A display control apparatus comprising:
a display control unit that causes a display unit to display a bird's eye-display image,
wherein the bird's eye-display image provides a bird's-eye-view drawing of a virtual three-dimensional space showing a location of a three-dimensional model with respect to a plurality of thumbnail images, and the thumbnail images are arranged at various positions in the bird's eye-display image, representing respective positions of the imaging device.

2. The display control apparatus according to claim 1, wherein the bird's eye-display image includes an alternative image representing contents or imaging situations of one of the thumbnail images.

3. The display control apparatus according to claim 2, wherein
a size of the thumbnail images is varied in accordance with the drawing positions of the thumbnail images in the virtual three-dimensional space; and
the alternative image is shown if a size of the one of the thumbnail images to be drawn is equal to or less than a predetermined size.

4. The display control apparatus according to claim 1, wherein the bird's eye-display image includes metadata about the thumbnail images in the virtual three-dimensional space in a condition where the metadata is related to the thumbnail images.

5. The display control apparatus according to claim 1, further comprising an image editing unit that generates, in response to specification of an angle in the bird's eye-display image shown on the display unit, the thumbnail images as viewed at the specified angle.

6. The display control apparatus according to claim 1, further comprising an image retrieval unit that retrieves an image containing a three-dimensional model which is the same as or similar to the three-dimensional model selected from the bird's eye-display image shown on the display unit or an object corresponding to the three-dimensional model.

7. The display control apparatus according to claim 1, wherein at least one of the thumbnail images is inclined with respect to an edge of the bird's eye-display image when the one of the thumbnail images is arranged in the bird's eye-display image, indicating an inclined angle of the imaging device when imaging the at least one of the thumbnail images.

8. The display control apparatus according to claim 1, wherein the thumbnail images are extracted from a video picked by an imaging device.

9. The display control apparatus according to claim 8, wherein the thumbnail images are arranged at the various positions in the bird's eye-display image, representing the respective positions of the imaging device when picking up the video.

10. The display control apparatus according to claim 9, wherein the bird's eye-display image includes an indicator representing a movement track of the imaging device when the imaging device picked up the video.

11. The display control apparatus according to claim 10, wherein:
the indicator is a movement track line representing the movement track of the imaging device when the imaging device picked up the video, and
the movement track line in the virtual three-dimensional space connects the thumbnail images in an order in which the thumbnail images were picked up.

12. The display control apparatus according to claim 11, wherein the movement track line connecting the thumbnail images is in various line types in accordance with contents or imaging situations of the video between the thumbnail images.

13. The display control apparatus according to claim 9, further comprising an image editing unit that edits the video in response to user operations on the thumbnail images or the three-dimensional model in the bird's eye-display image shown on the display unit.

14. The display control apparatus according to claim 8, wherein the thumbnail images is extracted from the video under one of the conditions:
at a predetermined time interval of the video;
where the thumbnail images were picked up when the imaging device was still; or
where an image quality of the thumbnail images is better than non-extracted images in the video.

15. A display control method comprising:
displaying a bird's eye-display image which provides a bird's-eye-view drawing of a virtual three-dimensional space showing a location of a three-dimensional model with respect to a plurality of thumbnail images, wherein the thumbnail images are arranged at various positions in the bird's eye-display image, representing respective positions of the imaging device.

16. A non-transitory computer-readable medium tangibly storing a program which, when executed by a computer, causing the computer to perform:
displaying a bird's eye-display image which provides a bird's-eye-view drawing of a virtual three-dimensional space showing a location of a three-dimensional model with respect to a plurality of thumbnail images, wherein the thumbnail images are arranged at various positions in the bird's eye-display image, representing respective positions of the imaging device.

* * * * *